United States Patent
Chen et al.

(10) Patent No.: US 11,432,218 B2
(45) Date of Patent: Aug. 30, 2022

(54) HANDOVER METHOD AND SYSTEM, AND DEVICE

(71) Applicant: Huawei Technologies Co., Ltd., Shenzhen (CN)

(72) Inventors: Jing Chen, Shanghai (CN); Ruchuan Du, Shanghai (CN); Caixia Qi, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 102 days.

(21) Appl. No.: 17/107,545

(22) Filed: Nov. 30, 2020

(65) Prior Publication Data

US 2021/0084554 A1 Mar. 18, 2021

Related U.S. Application Data

(63) Continuation of application No. PCT/CN2019/093369, filed on Jun. 27, 2019.

(30) Foreign Application Priority Data

Jul. 17, 2018 (CN) .......................... 201810783700.0

(51) Int. Cl.
*H04W 4/00* (2018.01)
*H04W 36/14* (2009.01)
(Continued)

(52) U.S. Cl.
CPC .......... *H04W 36/14* (2013.01); *H04L 61/4511* (2022.05); *H04W 4/029* (2018.02); *H04W 8/26* (2013.01); *H04W 36/08* (2013.01)

(58) Field of Classification Search
CPC ....... H04W 36/14; H04W 4/029; H04W 8/26; H04W 36/08; H04W 36/0016;
(Continued)

(56) References Cited

U.S. PATENT DOCUMENTS

2017/0078874 A1 3/2017 Lee et al.
2021/0084554 A1* 3/2021 Chen ..................... H04W 36/14

FOREIGN PATENT DOCUMENTS

CN 103220743 A 7/2013
CN 107018542 A 8/2017
(Continued)

OTHER PUBLICATIONS

Qualcomm Inc, "TS 23.502: Mobility Restriction List Clean up", 3GPP TSG-SA WG2 Meeting #128, S2-186758, Vilnius, Lithuania, Jul. 2-6, 2018, 24 pages.

(Continued)

*Primary Examiner* — Marcos Batista
(74) *Attorney, Agent, or Firm* — Slater Matsil, LLP

(57) ABSTRACT

A converged network device: receives a handover requirement from a first access device in a first network, where the handover requirement carries an identifier of a second access device in a second network or an identity of a tracking area served by the second access device; determines, based on the identifier of the second access device or the identity of the tracking area served by the second access device, that the second access device is managed by the converged network device; sends a handover request to the second access device, where the handover request is used to request the second access device to prepare a related resource for the terminal; sends a handover command to the first access device, where the handover command is used to instruct to hand over the terminal to the second access device; and receives a handover notification from the second access device.

20 Claims, 14 Drawing Sheets

(51) Int. Cl.
  *H04W 4/029* (2018.01)
  *H04W 8/26* (2009.01)
  *H04W 36/08* (2009.01)
  *H04L 61/4511* (2022.01)

(58) Field of Classification Search
  CPC ......... H04W 36/0033; H04W 36/0055; H04W 36/12; H04W 36/32; H04W 36/385; H04L 61/1511
  USPC .......................................... 370/331; 455/312
  See application file for complete search history.

(56) References Cited

FOREIGN PATENT DOCUMENTS

| | | |
|---|---|---|
| CN | 107404750 A | 11/2017 |
| WO | 2011050723 A1 | 5/2011 |
| WO | 2017052266 A1 | 3/2017 |

OTHER PUBLICATIONS

Ren, C., "Study on the Technology of 4G and 5G Fusion Networking and Interworking", China Unicom Network Technology Research Institute, Jan. 15, 2018, 15 pages.

ZTE, "TS 23.502 P-CR to handover from EPS to NGS", SA WG2 Meeting #120, S2-172154, Mar. 27-31, 2017, Busan, Korea, 4 pages.

China Telecom et al., "Study on Application Awareness Interworking between LTE and NR", 3GPP TSG SA WG2 #124, S2-178939, Nov. 27-Dec. 1, 2017, 7 pages.

Dequan, L. et al., "Research on 4G and 5G Converged Network Deployment Architecture", May 15, 2018, 7 pages.

3rd Generation Partnership Project; Technical Specification Group Radio Access Network; Evolved Universal Terrestrial Radio Access Network (E-UTRAN); S1 Application Protocol (S1AP) (Release 14), 3GPP TS 36.413 V14.3.0 (Jun. 2017), 347 pages.

Ericsson, "[E201] Handling of mapped GUMMEI at idle mode mobility from 5GS to EPS", 3GPP TSG RAN WG2 AH 1807, Tdoc R2-1810106, Montreal, Canada, Jul. 2-6, 2018, 5 pages.

3rd Generation Partnership Project; Technical Specification Group Services and System Aspects; Study on the security aspects of the next generation system (Release 14), 3GPP TR 33.899 V1.3.0 (Aug. 2017), 605 pages.

Cisco et al., "23.502: 5G to 4G mobility for SR UE without N26 interface", SA WG2 Meeting #124, S2-178320, Reno, NV, US, Nov. 27-Dec. 1, 2017, 3 pages.

3rd Generation Partnership Project; Technical Specification Group Services and System Aspects; Procedures for the 5G System; Stage 2 (Release 15), 3GPP TS 23.502 V15.0.0 (Dec. 2017), 20 pages.

3rd Generation Partnership Project; Technical Specification Group Core Network and Terminals; 5G System Phase 1; CT WG4 Aspects (Release 15), 3GPP TR 29.891 V1.1.0 (Oct. 2017), 146 pages.

3rd Generation Partnership Project; Technical Specification Group Services and System Aspects; System Architecture for the 5G System; Stage 2 (Release 15), 3GPP TS 23.501 V15.2.0 (Jun. 2018), 216 pages.

3rd Generation Partnership Project; Technical Specification Group Services and System Aspects; Procedures for the 5G System; Stage 2 (Release 15), 3GPP TS 23.502 V15.2.0 (Jun. 2018), 308 pages.

* cited by examiner

HANDOVER METHOD AND SYSTEM, AND DEVICE

CROSS-REFERENCE TO RELATED APPLICATIONS

This application is a continuation of International Application No. PCT/CN2019/093369, filed on Jun. 27, 2019, which claims priority to Chinese Patent Application No. 201810783700.0, filed on Jul. 17, 2018. The disclosures of the aforementioned applications are hereby incorporated by reference in their entireties.

TECHNICAL FIELD

This application relates to the field of communications technologies, and in particular, to a handover method and system, and a device.

BACKGROUND

Currently, in 3rd generation partnership project (3GPP) technical specification (TS) 23.501, an interoperation procedure of a terminal in a 4th generation (4G) network and a 5th generation (5G) network is defined. For example, the interoperation procedure includes a process of handing over the terminal from the 5G network to the 4G network, or a process of handing over the terminal from the 4G network to the 5G network.

To implement interoperation between the 4G network and the 5G network, in an interoperation architecture that is between the 4G network and the 5G network and that is currently discussed in the 3GPP standard group, an N26 interface is added between an access and mobility management function (AMF) network element in the 5G network and a mobility management entity (MME) in the 4G network. Communication between the MME and the AMF network element can be implemented by using the N26 interface.

However, in one aspect, when the foregoing interoperation procedure is performed by using the foregoing interoperation architecture, more signaling interaction needs to be added. For example, in the process of handing over the terminal from the 5G network to the 4G network, a source AMF network element needs to obtain address information of a target MME, and relocate to the target MME based on the address information of the target MME; or in the process of handing over the terminal from the 4G network to the 5G network, a source MME needs to obtain address information of a target AMF network element, and relocate to the target MME based on the address information of the target AMF network element. In another aspect, in the process of handing over the terminal from the 4G network to the 5G network, how the source MME queries the target AMF network element is not defined in the 3GPP protocol currently. In other words, currently, handover of the terminal from the 4G network to the 5G network cannot be actually implemented.

Therefore, how to simplify a handover procedure of the terminal and how to implement handover of the terminal from the 4G network to the 5G network are urgent problems to be resolved at present.

SUMMARY

Embodiments of this application provide a handover method and system, and a device, to simplify a handover procedure of a terminal and implement handover of the terminal from a 4G network to a 5G network.

To achieve the foregoing objective, the following technical solutions are used in the embodiments of this application.

According to a first aspect, a handover method is provided. The handover method includes: A converged network device receives a handover requirement from a first access device in a first network. The handover requirement carries an identifier of a second access device in a second network or an identity of a tracking area served by a second access device. The first network and the second network are different types of networks. The converged network device determines, based on the identifier of the second access device or the identity of the tracking area served by the second access device, that the second access device is managed by the converged network device. The converged network device sends a handover request to the second access device. The handover request is used to request the second access device to prepare a related resource for a terminal. The converged network device sends a handover command to the first access device. The handover command is used to instruct to hand over the terminal to the second access device. The converged network device receives a handover notification from the second access device. The handover notification is used to indicate that the terminal is handed over to the second access device. Based on this solution, in one aspect, because the handover requirement sent by the first access device to the converged network device carries the identifier of the second access device or the identity of the tracking area served by the second access device, the converged network device may determine, based on the identifier of the second access device or the identity of the tracking area served by the second access device, that the second access device is managed by the converged network device; then directly send, to the second access device, the handover request for requesting the second access device to prepare the related resource for the terminal; and send, to the first access device, the handover command for instructing the first access device to hand over the terminal to the second access device, so that handover of the terminal from the first network to the second network can be implemented. This is different from the prior art in which when the first network and the second network are different types of networks, a source mobility management network element needs to first query address information of a target mobility management network element, and then relocate to the target mobility management network element to implement the handover of the terminal from the first network to the second network. In this way, message interaction between network elements is reduced, and a handover procedure of the terminal is simplified. In addition, when the first network is a 4G network and the second network is a 5G network, handover of the terminal from the 4G network to the 5G network can be implemented. In another aspect, the converged network device in the handover method integrates a function of a first mobility management device in the first network and a function of a second mobility management device in the second network. Therefore, a quantity of devices in a network is reduced, and a workload of network operation and maintenance is reduced. In addition, network address resources are reduced, and complexity of network planning and deployment is reduced. Further, an occupation ratio of hardware resources may be flexibly adjusted based on service traffic of the first network and service traffic of the second network, so that the hardware resources are shared, to improve resource utilization efficiency and a rate of return on investment.

Optionally, in this embodiment of this application, the first network is a 5th generation 5G network, and the second network is a 4th generation 4G network. Alternatively, the first network is a 4G network, and the second network is a 5G network.

According to a second aspect, a handover method is provided. The handover method includes: A converged network device receives a handover requirement from a first access device in a first network. The handover requirement carries an identifier of a second access device in a second network or an identity of a tracking area served by a second access device. The first network is a 4th generation 4G network, and the second network is a 5th generation 5G network. The converged network device determines, based on the identifier of the second access device or the identity of the tracking area served by the second access device, that the second access device is not managed by the converged network device. The converged network device obtains address information of a target mobility management network element in the second network based on the identifier of the second access device or the identity of the tracking area served by the second access device, and relocates to the target mobility management network element based on the address information of the target mobility management network element. The converged network device sends a handover command to the first access device. The handover command is used to instruct the first access device to hand over a terminal to the second access device. Based on this solution, in one aspect, because the handover requirement sent by the first access device to the converged network device carries the identifier of the second access device or the identity of the tracking area served by the second access device, the converged network device may determine, based on the identifier of the second access device or the identity of the tracking area served by the second access device, that the second access device is not managed by the converged network device; then obtain the address information of the target mobility management network element in the second network based on the identifier of the second access device or the identity of the tracking area served by the second access device; and relocate to the target mobility management network element based on the address information of the target mobility management network element. Therefore, when the first network is a 4G network and the second network is a 5G network, handover of the terminal from the 4G network to the 5G network can be implemented. In another aspect, the converged network device in the handover method integrates a function of a first mobility management device in the first network and a function of a second mobility management device in the second network. Therefore, a quantity of devices in a network is reduced, and a workload of network operation and maintenance is reduced. In addition, network address resources are reduced, and complexity of network planning and deployment is reduced. Further, an occupation ratio of hardware resources may be flexibly adjusted based on service traffic of the first network and service traffic of the second network, so that the hardware resources are shared, to improve utilization of resources and a rate of return on investment.

In a possible design, that the converged network device obtains the address information of the target mobility management network element in the second network based on the identifier of the second access device or the identity of the tracking area served by the second access device is specifically: The converged network device constructs a first fully qualified domain name based on the identifier of the second access device. The first fully qualified domain name includes the identifier of the second access device. The converged network device sends the first fully qualified domain name to a domain name system DNS server. The first fully qualified domain name is used to determine address information of one or more candidate mobility management network elements in the 5G network. The converged network device receives the address information of the candidate mobility management network elements in the 5G network from the DNS server. The converged network device selects the address information of the target mobility management network element in the 5G network from the address information of the candidate mobility management network elements. Based on this solution, the converged network device can obtain the address information of the target mobility management network element in the second network.

Optionally, in this embodiment of this application, a format of the first fully qualified domain name is a fully qualified domain name format corresponding to an identifier of an access device in the 5G network, or a format of the first fully qualified domain name is a fully qualified domain name format corresponding to an identifier of an access device in the 4G network.

In a possible design, that the converged network device obtains the address information of the target mobility management network element in the second network based on the identifier of the second access device or the identity of the tracking area served by the second access device is specifically: The converged network device constructs a second fully qualified domain name based on the identity of the tracking area served by the second access device. The second fully qualified domain name includes the identity of the tracking area served by the second access device. The converged network device sends the second fully qualified domain name to a DNS server. The second fully qualified domain name is used to determine address information of one or more candidate mobility management network elements in the 5G network. The converged network device receives the address information of the candidate mobility management network elements in the 5G network from the DNS server. The converged network device selects the address information of the target mobility management network element in the 5G network from the address information of the candidate mobility management network elements. Based on this solution, the converged network device can obtain the address information of the target mobility management network element in the second network.

Optionally, in this embodiment of this application, a format of the second fully qualified domain name is a fully qualified domain name format corresponding to an identity of a tracking area in the 5G network, or a format of the second fully qualified domain name is a fully qualified domain name format corresponding to an identity of a tracking area in the 4G network.

In a possible design, that the converged network device obtains the address information of the target mobility management network element in the second network based on the identifier of the second access device or the identity of the tracking area served by the second access device is specifically: The converged network device constructs a third fully qualified domain name based on the identity of the tracking area served by the second access device. The third fully qualified domain name includes a mobile country code MCC, a mobile network code MNC, and 16 low-order bits of a tracking area code TAC in the identity of the tracking area served by the second access device. A format of the third fully qualified domain name is a fully qualified domain name format corresponding to an identity of a tracking area in the 4G network. The converged network device sends the third fully qualified domain name to a DNS server. The third fully qualified domain name is used to query address information of one or more candidate mobility management network elements in the 5G network. The converged network device receives the address information of the candidate mobility management network elements in the 5G network from the DNS server. The converged network device selects the address information of the target mobility management network element in the 5G network from the address information of the candidate mobility management network elements. Based on this solution, the converged network device can obtain the address information of the target mobility management network element in the second network.

In a possible design, the 16 low-order bits of the TAC in the identity of the tracking area served by the second access device are the same as a TAC in an identity of a tracking area served by the first access device. In this way, when the address information of the candidate mobility management network elements in the second network is determined, the address information of the candidate mobility management network elements in the second network may be uniquely determined based on the 16 low-order bits of the TAC in the identity of the tracking area served by the second access device. The address information of the candidate mobility management network elements is actually address information of a candidate converged network device. This is not specifically limited in this embodiment of this application.

In a possible design, that the converged network device relocates to the target mobility management network element based on the address information of the target mobility management network element is specifically: The converged network device sends a forward relocation request message to the target mobility management network element. The forward relocation request message carries a 4G context of the terminal, and is used to request the target mobility management network element to prepare a resource for the terminal. In other words, the converged network device may serve as a mobility management network element in the 4G network to relocate to the target mobility management network element in the 5G network.

In a possible design, that the converged network device obtains the address information of the target mobility management network element in the second network based on the identifier of the second access device or the identity of the tracking area served by the second access device is specifically: The converged network device sends the identifier of the second access device or the identity of the tracking area served by the second access device to a network repository function network element. The identifier of the second access device or the identity of the tracking area served by the second access device is used to query address information of one or more candidate mobility management network elements in the 5G network. The converged network device receives the address information of the candidate mobility management network elements in the 5G network from the network repository function network element. The converged network device selects the address information of the target mobility management network element in the 5G network from the address information of the candidate mobility management network elements. Based on this solution, the converged network device can obtain the address information of the target mobility management network element in the second network.

In a possible design, that the converged network device relocates to the target mobility management network element based on the address information of the target mobility management network element is specifically: The converged network device sends a context create request message to the target mobility management network element. The context create request message carries a 5G context converted from a 4G context of the terminal, and is used to request the target mobility management network element to prepare a resource for the terminal. In other words, the converged network device may serve as a mobility management network element in the 5G network to relocate to the target mobility management network element in the 5G network.

In a possible design, the handover method provided in this embodiment of this application further includes: The converged network device receives an N2 notification message from the target mobility management network element. The N2 notification message is used to indicate the converged network device to release a related resource of the terminal. The converged network device releases the related resource of the terminal based on the N2 notification message. Based on this solution, the converged network device can release the related resource of the terminal, so that storage space of the converged network device is saved.

According to a third aspect, a converged network device is provided. The converged network device has a function for implementing the method in the first aspect or the second aspect. The function may be implemented by hardware, or may be implemented by hardware executing corresponding software. The hardware or the software includes one or more modules corresponding to the foregoing function.

According to a fourth aspect, a converged network device is provided, including a processor and a memory. The memory is configured to store a computer execution instruction. When the converged network device runs, the processor executes the computer execution instruction stored in the memory, to enable the converged network device to perform the handover method in the first aspect or the second aspect.

According to a fifth aspect, a converged network device is provided. The converged network device includes a processor. The processor is configured to: couple to a memory, and perform the handover method in the first aspect or the second aspect based on an instruction after reading the instruction in the memory.

According to a sixth aspect, a computer-readable storage medium is provided. The computer-readable storage medium stores an instruction. When the instruction is run on a computer, the computer is enabled to perform the handover method in the first aspect or the second aspect.

According to a seventh aspect, a computer program product including an instruction is provided. When the computer program product is run on a computer, the computer is enabled to perform the handover method in the first aspect or the second aspect.

According to an eighth aspect, an apparatus (for example, the apparatus may be a chip system) is provided. The apparatus includes a processor, configured to support a converged network device in implementing related functions in the first aspect or the second aspect, for example, determining, based on an identifier of a second access device or an identity of a tracking area served by a second access device, that the second access device is managed by the converged network device. In a possible design, the apparatus further includes a memory. The memory is configured to store a program instruction and data that are necessary for the converged network device. When the apparatus is the chip system, the apparatus may include a chip, or may include a chip and another discrete device.

For a technical effect brought by any design manner in the third aspect to the eighth aspect, refer to technical effects brought by different design manners in the first aspect or the second aspect. Details are not described herein again.

According to a ninth aspect, a handover system is provided. The handover system includes a converged network device, a first access device in a first network, and a second access device in a second network. The first network and the second network are different types of networks. The first access device is configured to send a handover requirement to the converged network device. The handover requirement carries an identifier of the second access device or an identity of a tracking area served by the second access device. The converged network device is configured to: receive the handover requirement from the first access device; determine, based on the identifier of the second access device or the identity of the tracking area served by the second access device, that the second access device is managed by the converged network device; and send a handover request to the second access device. The handover request is used to request the second access device to prepare a related resource for a terminal. The second access device is configured to: receive the handover request from the converged network device, and prepare the related resource for the terminal based on the handover request. The converged network device is further configured to send a handover command to the first access device. The handover command is used to instruct to hand over the terminal to the second access device. The first access device is further configured to: receive the handover command from the converged network device, and send the handover command to the terminal. The second access device is further configured to send a handover notification to the converged network device. The handover notification is used to indicate that the terminal is handed over to the second access device. The converged network device is further configured to receive the handover notification from the second access device.

For a technical effect of the ninth aspect, refer to the technical effect of the first aspect. Details are not described herein again.

According to a tenth aspect, a handover system is provided. The handover system includes a converged network device, a first access device in a first network, a second access device in a second network, and a target mobility management network element in the second network. The first network is a 4th generation 4G network, and the second network is a 5th generation 5G network. The first access device is configured to send a handover requirement to the converged network device. The handover requirement carries an identifier of the second access device or an identity of a tracking area served by the second access device. The converged network device is configured to: receive the handover requirement from the first access device; determine, based on the identifier of the second access device or the identity of the tracking area served by the second access device, that the second access device is not managed by the converged network device; obtain address information of the target mobility management network element based on the identifier of the second access device or the identity of the tracking area served by the second access device; and relocate to the target mobility management network element based on the address information of the target mobility management network element. The target mobility management network element is configured to send a handover request to the second access device. The handover request is used to request the second access device to prepare a related resource for a terminal. The second access device is configured to: receive the handover request from the converged network device, and prepare the related resource for the terminal. The converged network device is further configured to send a handover command to the first access device. The handover command is used to instruct the first access device to hand over the terminal to the second access device. The first access device is further configured to: receive the handover command from the converged network device, and send the handover command to the terminal. The second access device is further configured to send a handover notification to the target mobility management network element. The handover notification is used to indicate that the terminal is handed over to the second access device. The target mobility management network element is further configured to receive the handover notification from the second access device.

For a technical effect of the tenth aspect, refer to the technical effect of the second aspect. Details are not described herein again.

These aspects or other aspects of this application are clearer and more comprehensible in descriptions of the following embodiments.

DETAILED DESCRIPTION OF ILLUSTRATIVE EMBODIMENTS

The following describes the technical solutions in the embodiments of this application with reference to the accompanying drawings in the embodiments of this application. In descriptions of this application, unless otherwise specified, "/" represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists, where A or B may be singular or plural. In addition, in the descriptions of this application, unless otherwise specified, "a plurality of" means two or more than two. "At least one of the following" or a similar expression thereof means any combination of these items, including any combination of a single item or a plurality of items. For example, at least one of a, b, or c may represent a, b, c, a-b, a-c, b-c, or a-b-c, where a, b, and c may be singular or plural. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and the terms such as "first" and "second" do not mean being definitely different either.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that: With evolution of the network architecture and emergence of new service scenarios, the technical solutions provided in the embodiments of this application are also applicable to similar technical problems.

Figure 1:
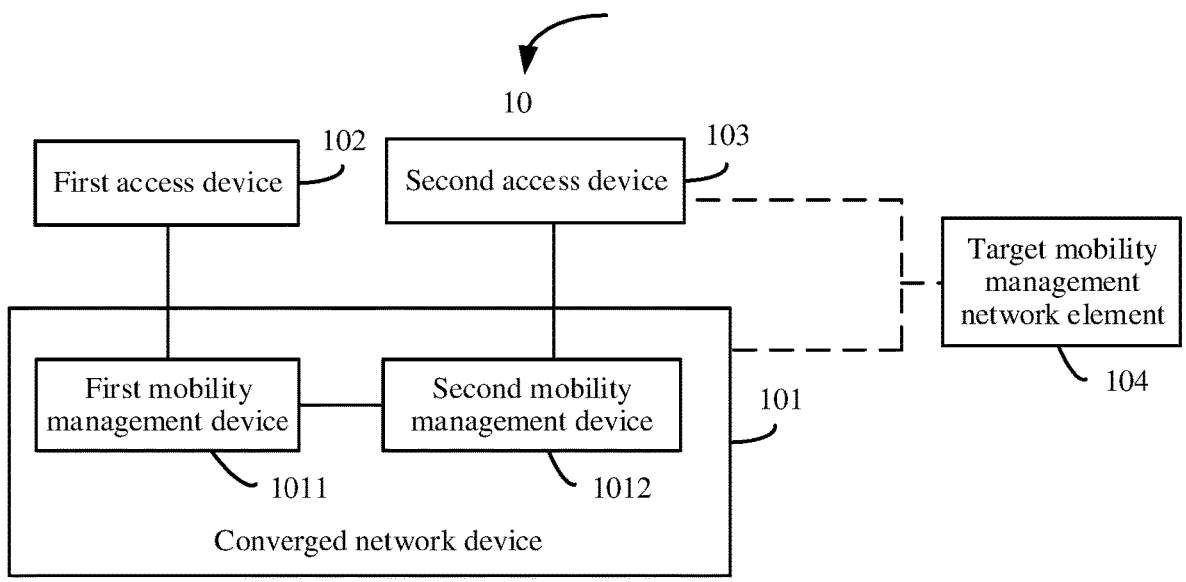
FIG. 1 is a schematic structural diagram of a handover system according to an embodiment of this application.

FIG. 1 shows a handover system 10 according to an embodiment of this application. The handover system 10 includes a converged network device 101, a first access device 102 in a first network, and a second access device 103 in a second network. The converged network device 101 integrates a function of a first mobility management device 101 in the first network and a function of a second mobility management device 1012 in the second network. The converged network device 101 may serve as the first mobility management device 1011 in the first network, or may serve as the second mobility management device 1012 in the second network. The first network and the second network are different types of networks. This is described herein in a unified manner, and not described again in the following.

In a possible implementation:

The first access device 102 is configured to send a handover requirement to the converged network device 101. The handover requirement carries an identifier of the second access device 103 or an identity of a tracking area served by the second access device 103.

The converged network device 101 is configured to: receive the handover requirement from the first access device 102; determine, based on the identifier of the second access device 103 or the identity of the tracking area served by the second access device 103, that the second access device 103 is managed by the converged network device 101; and further send a handover request to the second access device 103. The handover request is used to request the second access device 103 to prepare a related resource for a terminal.

The second access device 103 is configured to: receive the handover request from the converged network device 101, and prepare the related resource for the terminal based on the handover request.

The converged network device 101 is further configured to send a handover command to the first access device 102. The handover command is used to instruct to hand over the terminal to the second access device 103.

The first access device 102 is further configured to: receive the handover command from the converged network device 101, and send the handover command to the terminal.

The second access device 103 is further configured to send a handover notification to the converged network device 101. The handover notification is used to indicate that the terminal is handed over to the second access device 103.

The converged network device 101 is further configured to receive the handover notification from the second access device 103.

Optionally, in this embodiment of this application, the first network may be a 4G network, and the second network may be a 5G network. Alternatively, in this embodiment of this application, the first network may be a 5G network, and the second network may be a 4G network. Alternatively, in this embodiment of this application, the first network and the second network may be other networks. This is not specifically limited in this embodiment of this application.

Based on the handover system provided in this embodiment of this application, in one aspect, because the handover requirement sent by the first access device to the converged network device carries the identifier of the second access device or the identity of the tracking area served by the second access device, the converged network device may determine, based on the identifier of the second access device or the identity of the tracking area served by the second access device, that the second access device is managed by the converged network device; directly send, to the second access device, the handover request for requesting the second access device to prepare the related resource for the terminal; and send, to the first access device, the handover command for instructing the first access device to hand over the terminal to the second access device, so that handover of the terminal from the first network to the second network can be implemented. This is different from the prior art in which when the first network and the second network are different types of networks, a source mobility management network element needs to first query address information of a target mobility management network element, and then relocate to the target mobility management network element to implement handover of the terminal from the first network to the second network. In this way, message interaction between network elements is reduced, and a handover procedure of the terminal is simplified. In addition, when the first network is a 4G network and the second network is a 5G network, handover of the terminal from the 4G network to the 5G network can be implemented. In another aspect, the converged network device in the handover system integrates the function of the first mobility management device in the first network and the function of the second mobility management device in the second network. Therefore, a quantity of devices in a network is reduced, and a workload of network operation and maintenance is reduced. In addition, network address resources are reduced, and complexity of network planning and deployment is reduced. Further, an occupation ratio of hardware resources may be flexibly adjusted based on service traffic of the first network and service traffic of the second network, thereby sharing the hardware resources, to improve resource utilization efficiency and a rate of return on investment.

In another possible implementation, when the first network is a 4G network and the second network is a 5G network, the handover system 10 shown in FIG. 1 may further include a target mobility management network element 104 in the second network.

The first access device 102 is configured to send a handover requirement to the converged network device 101. The handover requirement carries an identifier of the second access device 103 or an identity of a tracking area served by the second access device 103.

The converged network device 101 is configured to: receive the handover requirement from the first access device 102; determine, based on the identifier of the second access device 103 or the identity of the tracking area served by the second access device 103, that the second access device 103 is not managed by the converged network device 101; obtain address information of the target mobility management network element 104 in the second network based on the identifier of the second access device 102 or the identity of the tracking area served by the second access device 102; and relocate to the target mobility management network element 104 based on the address information of the target mobility management network element 104.

The target mobility management network element 104 is configured to send a handover request to the second access device 103. The handover request is used to request the second access device 103 to prepare a related resource for a terminal.

The second access device 103 is configured to: receive the handover request from the converged network device 101, and prepare the related resource for the terminal based on the handover request.

The converged network device 101 is further configured to send a handover command to the first access device 102. The handover command is used to instruct to hand over the terminal to the second access device 103.

The first access device 102 is further configured to: receive the handover command from the converged network device 101, and send the handover command to the terminal.

The second access device 103 is further configured to send a handover notification to the target mobility management network element 104. The handover notification is used to indicate that the terminal is handed over to the second access device 103.

The target mobility management network element 104 is further configured to receive the handover notification from the second access device 103.

Based on the handover system provided in this embodiment of this application, in one aspect, because the handover requirement sent by the first access device to the converged network device carries the identifier of the second access device or the identity of the tracking area served by the second access device, the converged network device may determine, based on the identifier of the second access device or the identity of the tracking area served by the second access device, that the second access device is not managed by the converged network device; then obtain the address information of the target mobility management network element in the second network based on the identifier of the second access device or the identity of the tracking area served by the second access device; and relocate to the target mobility management network element based on the address information of the target mobility management network element. Therefore, when the first network is a 4G network and the second network is a 5G network, handover of the terminal from the 4G network to the 5G network can be implemented. In another aspect, the converged network device in the handover system integrates the function of the first mobility management device in the first network and the function of the second mobility management device in the second network. Therefore, a quantity of devices in a network is reduced, and a workload of network operation and maintenance is reduced. In addition, network address resources are reduced, and complexity of network planning and deployment is reduced. Further, an occupation ratio of hardware resources may be flexibly adjusted based on service traffic of the first network and service traffic of the second network, thereby sharing the hardware resources, to improve resource utilization efficiency and a rate of return on investment.

Optionally, in this embodiment of this application, the converged network device 101 may directly communicate with the first access device 102 or the second network device 103, or may communicate with the first access device 102 or the second access device 103 through forwarding performed by another device. This is not specifically limited in this embodiment of this application.

Optionally, in this embodiment of this application, the target mobility management network element 104 may directly communicate with the second access device 103 or the converged network device 101, or may communicate with the second access device 103 or the converged network device 101 through forwarding performed by another device. This is not specifically limited in this embodiment of this application.

Figure 2:
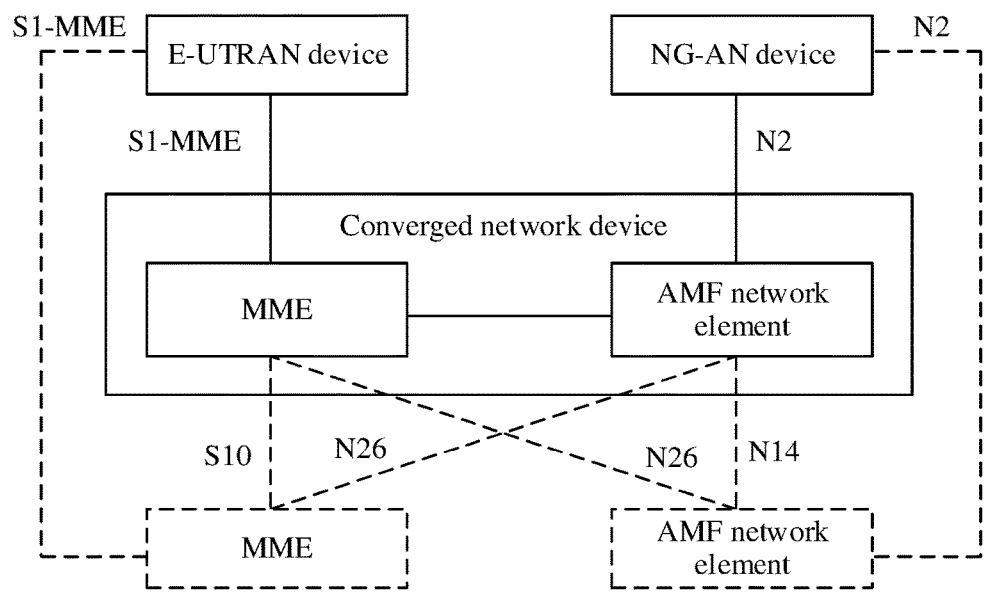
FIG. 2 is a schematic diagram of applying a handover system in a 4G network and a 5G network according to an embodiment of this application.

For example, the first network is a 4G network, and the second network is a 5G network; or, the second network is a 4G network, and the first network is a 5G network. As shown in FIG. 2, a converged network device integrates a function of an MME in 4G and a function of an AMF network element in a 5G network. When the converged network device serves as the MME, a corresponding access device is an evolved universal terrestrial radio access network (E-UTRAN) device in the 4G network. When the converged network device serves the AMF network element, a corresponding access device is a next generation radio access network (NG-AN) device in the 5G network. In addition, as shown in FIG. 2, a handover system may further include one or more of the MME and the AMF network element. This is not specifically limited in this embodiment of this application.

A converged network device is configured with a "local address of a unified peer network element interface". When the converged network device serves as the AMF network element and communicates with an AMF network element, the local address serves as an N14 interface address. When the converged network device serves as the AMF network element and communicates with an MME network element, the local address serves as an N26 interface address. When the converged network device serves as the MME and communicates with an AMF network element, the local address is used as an N26 interface address. When the converged network device serves as the MME and communicates with an MME, the local address is used as an S10 interface address.

The converged network device is configured with a "local address of a unified wireless device". When the converged network device serves as the AMF network element and communicates with an NG-AN device, the local address is used as an N2 interface address. When the converged network device serves as the MME and communicates with an E-UTRAN device, the local address serves as an S1-MME interface address.

In addition, the E-UTRAN device may further communicate with the MME by using an S1-MME interface, and the NG-AN device may further communicate with the AMF network element by using an N2 interface. For details, refer to descriptions of an existing 4G network and an existing 5G network. Details are not described herein.

It should be noted that FIG. 2 is described by merely using an example in which the handover system includes one converged network device. Certainly, the handover system may include one or more converged network devices. This is not specifically limited in this embodiment of this application.

It should be noted that FIG. 2 is described by merely using an example in which the converged network device serves as the MME and is connected to the E-UTRAN device. Certainly, the converged network device may serve as the MME and be connected to one or more E-UTRAN devices. This is not specifically limited in this embodiment of this application.

It should be noted that FIG. 2 is described by merely using an example in which the converged network device serves as the MME and is connected to the AMF network element or the MME. Certainly, the converged network device may serve as the MME and be connected to one or more MMEs, or the converged network device may serve as the MME and be connected to one or more AMF network elements. This is not specifically limited in this embodiment of this application.

It should be noted that FIG. 2 is described by merely using an example in which the converged network device serves as the AMF network element and is connected to the NG-AN device. Certainly, the converged network device may serve as the AMF network element and be connected to one or more NG-AN devices. This is not specifically limited in this embodiment of this application.

It should be noted that FIG. 2 is described by merely using an example in which the converged network device serves as the AMF network element and is connected to the AMF network element or the MME. Certainly, the converged network device may serve as the AMF network element and be connected to one or more MMEs, or the converged network device may serve as the AMF network element and be connected to one or more AMF network elements. This is not specifically limited in this embodiment of this application.

It should be noted that FIG. 2 is described by merely using an example in which the E-UTRAN device is connected to the converged network device. Certainly, the E-UTRAN device may be alternatively connected to another converged network device or MME. This is not specifically limited in this embodiment of this application.

It should be noted that FIG. 2 is described by merely using an example in which the NG-AN device is connected to the converged network device. Certainly, the NG-AN device may be alternatively connected to another converged network device or AMF network element. This is not specifically limited in this embodiment of this application.

Optionally, the terminal in this embodiment of this application may include various handheld devices, in-vehicle devices, wearable devices, or computing devices that have a wireless communication function, or another processing device connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, the devices mentioned above are collectively referred to as a terminal in this application.

Optionally, the access device (for example, the first access device or the second access device) in this embodiment of this application is a device that accesses a core network. For example, the access device may be a base station, a broadband network gateway (BNG), an aggregation switch, or a non-3rd generation partnership project (3GPP) access device. The base station may include base stations in various forms, such as a macro base station, a micro base station (also referred to as a small cell), a relay station, an access point, and the like.

Optionally, the converged network device in FIG. 1 in this embodiment of this application may be implemented by using one device, or may be implemented by using a plurality of devices together, or may be a function module in one device. This is not specifically limited in this embodiment of this application. It may be understood that the foregoing functions may be a network element in a hardware device, a software function run on dedicated hardware, or a virtualized function instantiated on a platform (for example, a cloud platform).

Figure 3:
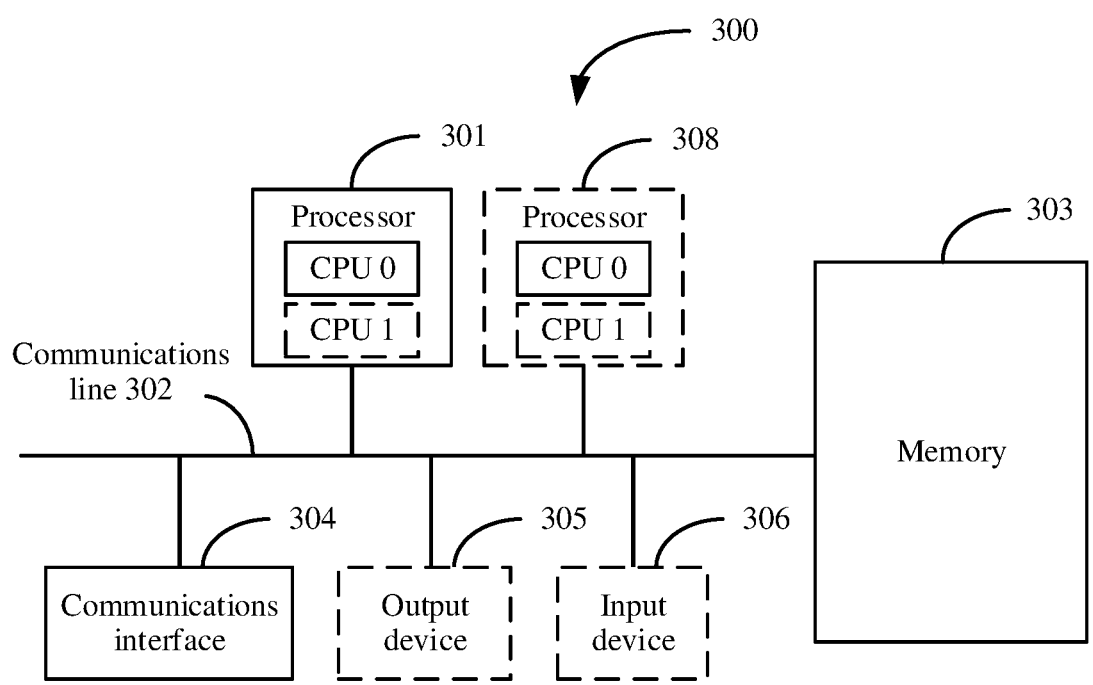
FIG. 3 is a schematic structural diagram of hardware of a communications device according to an embodiment of this application.

For example, the converged network device in FIG. 1 in this embodiment of this application may be implemented by using a communications device in FIG. 3. FIG. 3 is a schematic structural diagram of hardware of a communications device according to an embodiment of this application. The communications device 300 includes a processor 301, a communications line 302, a memory 303, and one or more communications interfaces (FIG. 3 is described by using one communications interface 304 as an example).

The processor 301 may be a general purpose central processing unit (CPU), a microprocessor, an application-specific integrated circuit (ASIC), or one or more integrated circuits configured to control program execution of the solutions in this application.

The communications line 302 may include a path used for transmitting information between the foregoing components.

The communications interface 304 can be any apparatus such as a transceiver, and is configured to communicate with another device or communications network, such as the Ethernet, a radio access network (RAN), or a wireless local area network (WLAN).

The memory 303 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM), another compact disc storage or optical disc storage (including a compact disc, a laser disc, an optical disc, a digital versatile disc, a blue-ray optical disc, and the like), a magnetic disk storage medium or another magnetic storage device, or any other medium that can carry or store expected program code in a form of instructions or data structures and can be accessed by a computer. However, this is not limited thereto. The memory may exist independently and is connected to the processor by using the communications line 302. Alternatively, the memory may be integrated with the processor.

The memory 303 is configured to store a computer execution instruction for executing the solutions of this application. The processor 301 controls the execution. The processor 301 is configured to execute the computer execution instruction stored in the memory 303, to implement a handover method provided in the following embodiments of this application.

Optionally, the computer execution instruction in this embodiment of this application may also be referred to as application program code. This is not specifically limited in this embodiment of this application.

In specific implementation, in an embodiment, the processor 301 may include one or more CPUs, for example, a CPU 0 and a CPU 1 in FIG. 3.

In specific implementation, in an embodiment, the communications device 300 may include a plurality of processors, for example, the processor 301 and a processor 308 in FIG. 3. Each of the processors may be a single-core processor (single-CPU), or may be a multi-core processor (multi-CPU). The processor herein may be one or more devices, circuits, and/or processing cores for processing data (such as a computer program instruction).

In specific implementation, in an embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive input from a user in a plurality of manners. For example, the input device 306 may be a mouse, a keyboard, a touchscreen device, or a sensing device.

The foregoing communications device 300 may be a general purpose device or a dedicated device. In specific implementation, the communications device 300 may be a desktop computer, a portable computer, a network server, a palmtop computer (PDA), a mobile phone, a tablet computer, a wireless terminal device, an embedded device, or a device with a structure similar to that in FIG. 3. A type of the communications device 300 is not limited in this embodiment of this application.

The following specifically describes the handover method provided in the embodiments of this application with reference to FIG. 1 to FIG. 3.

It should be noted that a name of a message, a name of each parameter in a message, or the like between network elements in the following embodiments of this application is merely an example, and may be alternatively another name in specific implementation. This is not specifically limited in this embodiment of this application.

For ease of understanding of the solutions in the following embodiments, a related description is first provided in the following.

First, an identifier of an E-UTRAN device in the 4G network and an identity of a tracking area (TAI) served by the E-UTRAN device in the 4G network (hereinafter referred to as a 4G-TAI) are described.

Figure 4:
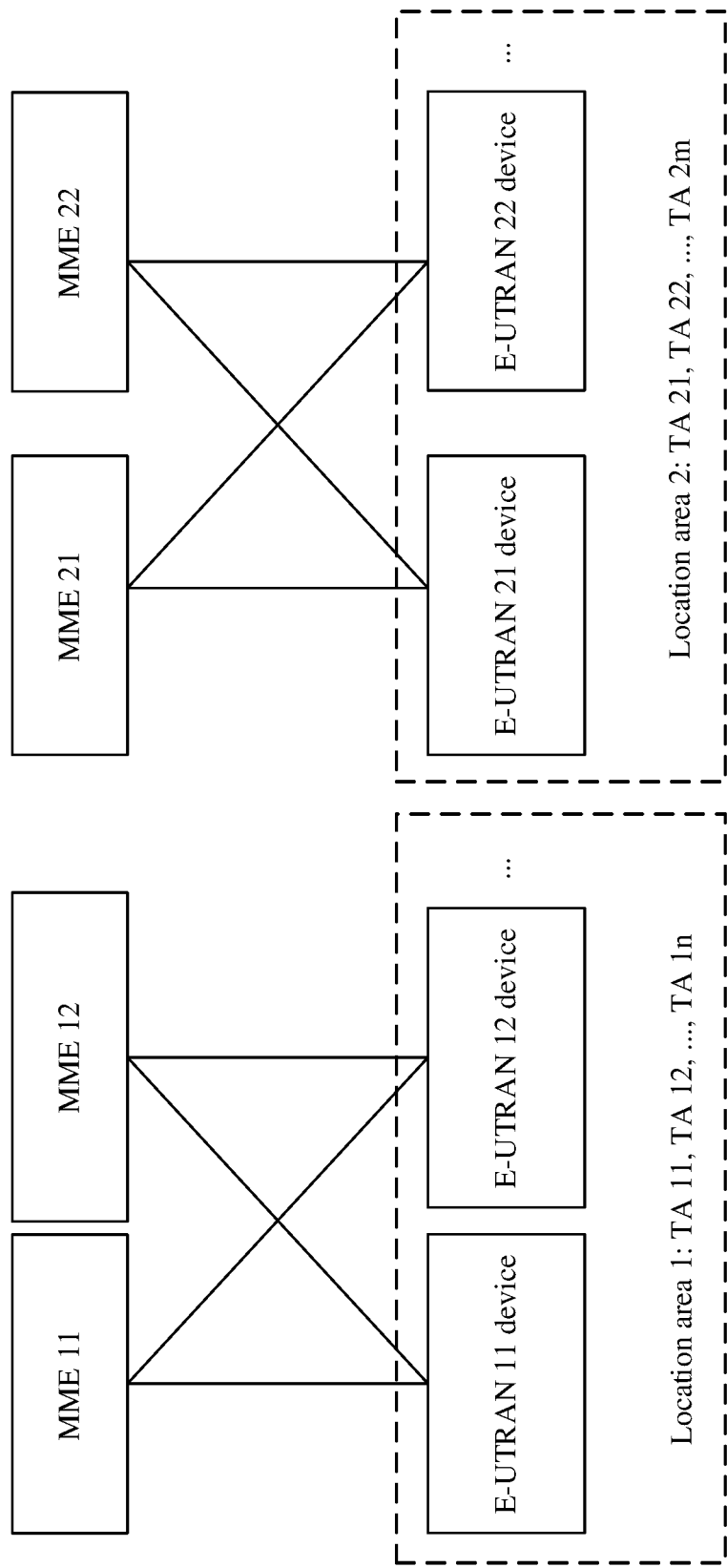
FIG. 4 is a schematic diagram of network deployment of an MME and an E-UTRAN device in an existing 4G network.

In the 4G network, each MME is connected to a plurality of E-UTRAN devices. These E-UTRAN devices cover a group of tracking areas (TA), that is, a coverage area of a 4G wireless network. For example, as shown in FIG. 4, an MME 11 may be separately connected to an E-UTRAN 11 device and an E-UTRAN 12 device, and an MME 12 may be separately connected to the E-UTRAN 11 device and the E-UTRAN 12 device. The E-UTRAN 11 device, the E-UTRAN 12 device, and the like may cover a location area 1. The location area 1 includes a TA 11, a TA 12, . . . , and a TA 1n. An MME 21 may be separately connected to an E-UTRAN 21 device and an E-UTRAN 22 device, and an MME 22 may be separately connected to the E-UTRAN 21 device and the E-UTRAN 22 device. The E-UTRAN 21 device, the E-UTRAN 22 device, and the like may cover a location area 2. The location area 2 includes a TA 21, a TA 22, . . . , and a TA 2m.

Figure 5:
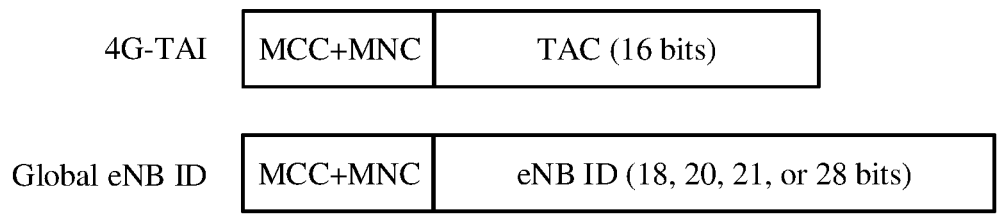
FIG. 5 is a schematic diagram of a format of an identifier of an E-UTRAN device and a format of a 4G-TAI in an existing 4G network.

A globally unique identity of the 4G-TA is referred to as a 4G-TAI. A composition structure of the 4G-TAI is shown in FIG. 5, and includes a mobile country code (MCC), a mobile network code (MNC), and a 16-bit tracking area code (TAC). The MCC identifies a country to which an operator belongs. The MNC is a network identifier of the operator. The TAC uniquely identifies a location area in a case of MCC+MNC.

The identifier of the E-UTRAN device may be denoted as a global evolved nodeB (eNB) identifier (ID). A composition structure of the global evolved nodeB identifier is shown in FIG. 5, and includes an MCC, an MNC, and an eNB ID of 18 bits, 20 bits, 21 bits, or 28 bits. The MCC identifies a country to which an operator belongs. The MNC is a network identifier of the operator. The eNB ID uniquely identifies an E-UTRAN device in a case of MCC+MNC.

Second, an identifier of an NG-AN device in the 5G network and a TAI served by the NG-AN device in the 5G network (hereinafter referred to as a 5G-TAI) are described.

Figure 6:
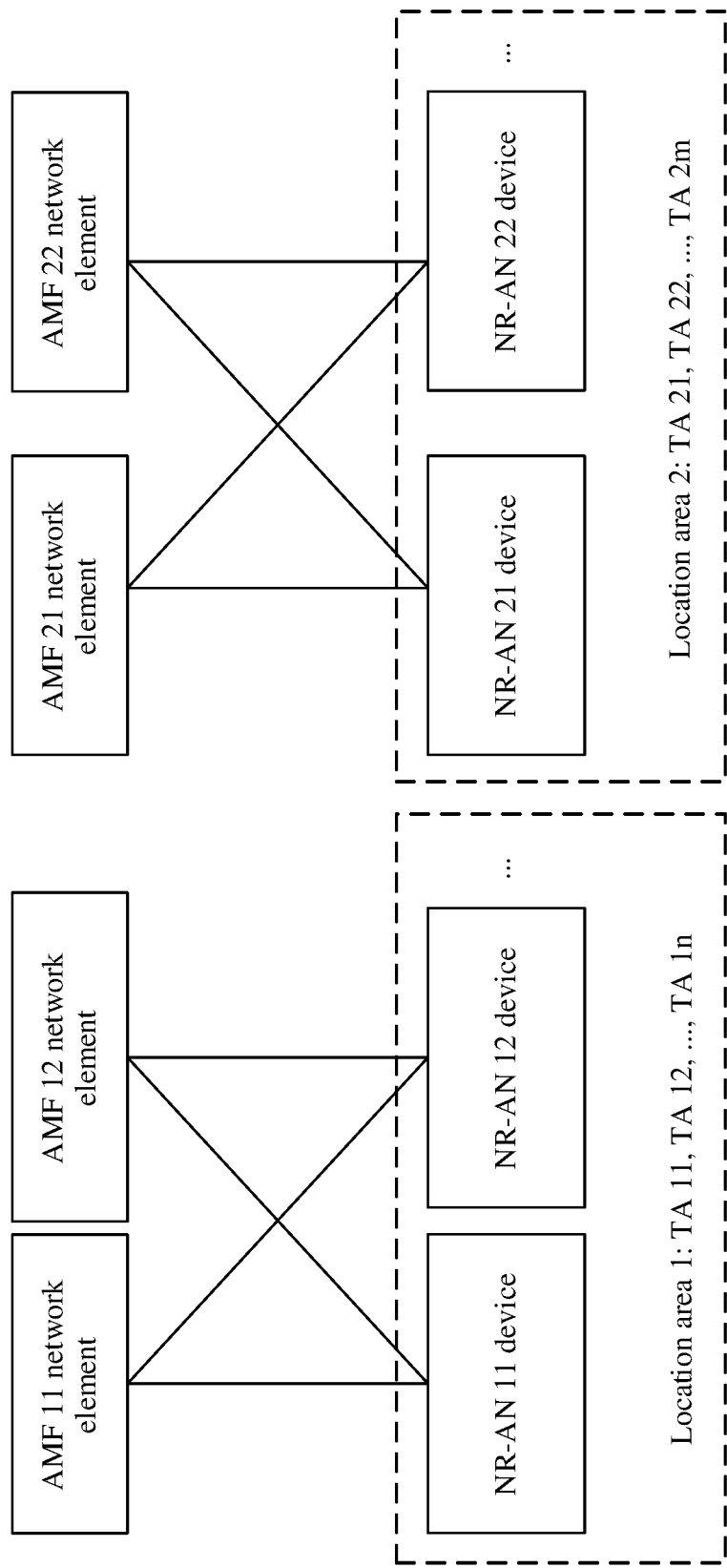
FIG. 6 is a schematic diagram of network deployment of an AMF network element and an NG-AN device in an existing 5G network.

In the 5G network, each AMF network element is connected to a plurality of NG-AN devices. These NG-AN devices cover a group of TAs, that is, a coverage area of a 5G wireless network. For example, as shown in FIG. 6, an AMF 11 network element may be separately connected to an NG-AN 11 device and an NG-AN 12 device, and an AMF 12 network element may be separately connected to the NG-AN 11 device and the NG-AN 12 device. The NG-AN 11 device, the NG-AN device, and the like may cover a location area 1. The location area 1 includes a TA 11, a TA 12, . . . , and a TA 1n. An AMF 21 network element may be separately connected to an NG-AN 21 device and an NG-AN 22 device, and an AMF 22 network element may be separately connected to the NG-AN 21 device and the NG-AN 22 device. The NG-AN 21 device, the NG-AN 22 device, and the like may cover a location area 2. The location area 2 includes a TA 21, a TA 22, . . . , and a TA 2m.

Figure 7:
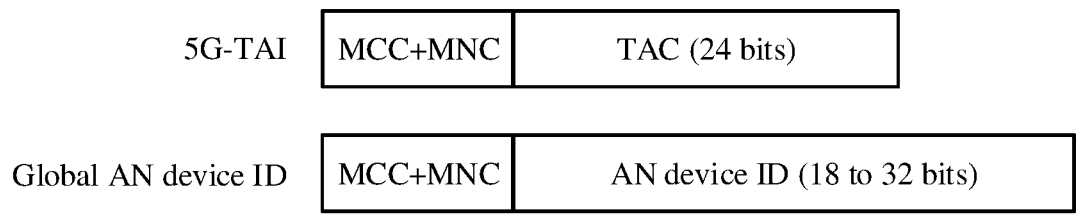
FIG. 7 is a schematic diagram of a format of an identifier of an NG-AN device and a format of a 5G-TAI in an existing 5G network.

A globally unique identity of the 5G-TA is referred to as a 5G-TAI. A composition structure of the 5G-TAI is shown in FIG. 7, and includes an MCC, an MNC, and a 24-bit TAC. The MCC identifies a country to which an operator belongs. The MNC is a network identifier of the operator. The TAC uniquely identifies a location area in a case of MCC+MNC.

The identifier of the NG-AN device may be denoted as a global AN device ID. A composition structure of the global AN device ID is shown in FIG. 7, and includes an MCC, an MNC, and an AN device ID of 18 bits to 32 bits. The MCC identifies a country to which an operator belongs. The MNC is a network identifier of the operator. The AN device ID uniquely identifies an NG-AN device.

It may be learned from the foregoing description that, when the 4G network is compared with the 5G network, the 4G-TAC is 8 bits less than the 5G-TAC, that is, one byte, and a length range of the global eNB ID in the 4G network is different from a length range of the global AN device ID in the 5G network.

The following specifically describes the handover method provided in the embodiments of this application with reference to the foregoing descriptions.

Figure 8A:
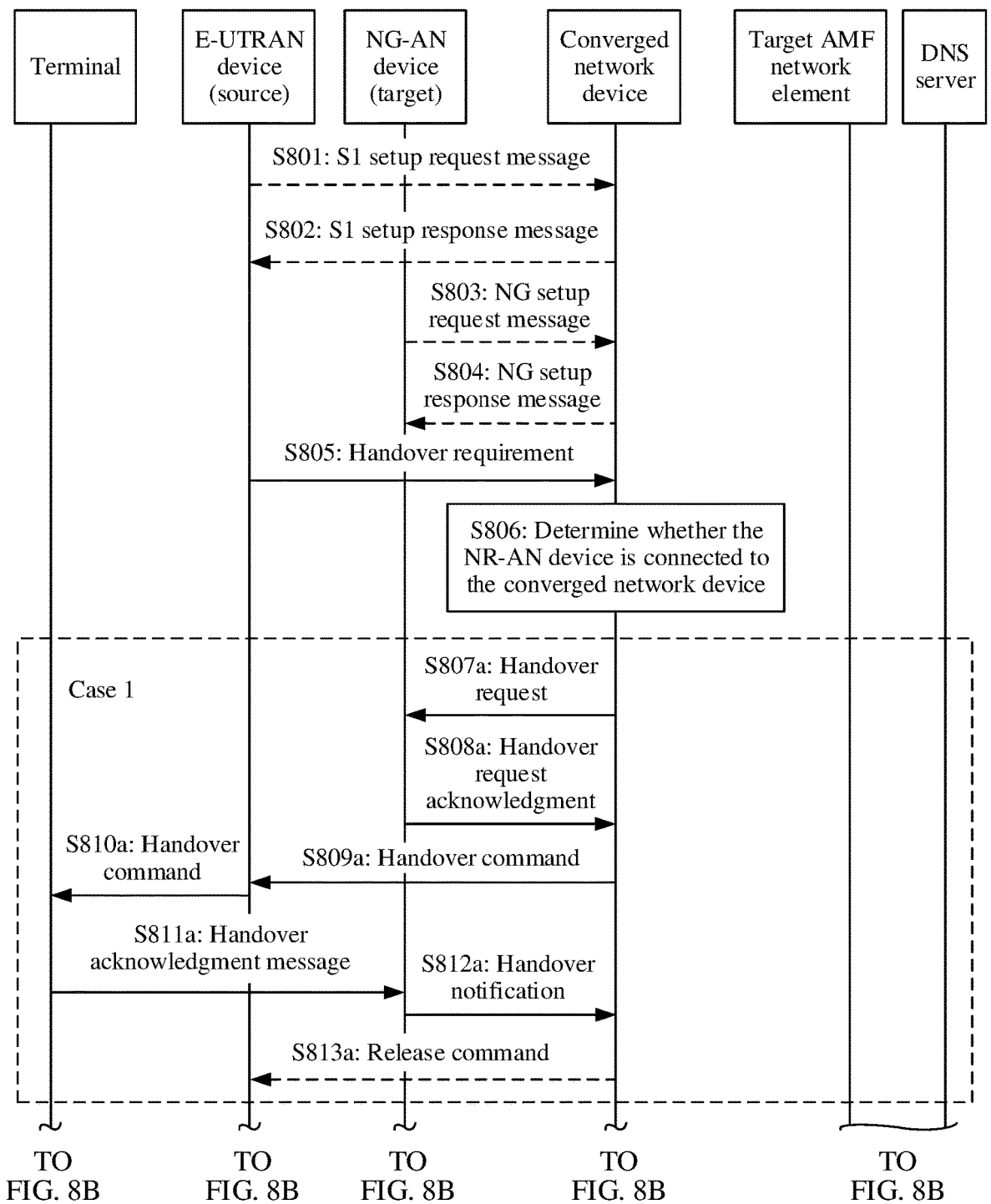
FIG. 8A and FIG. 8B are a schematic flowchart 1 of a handover method according to an embodiment of this application.
Figure 8B:
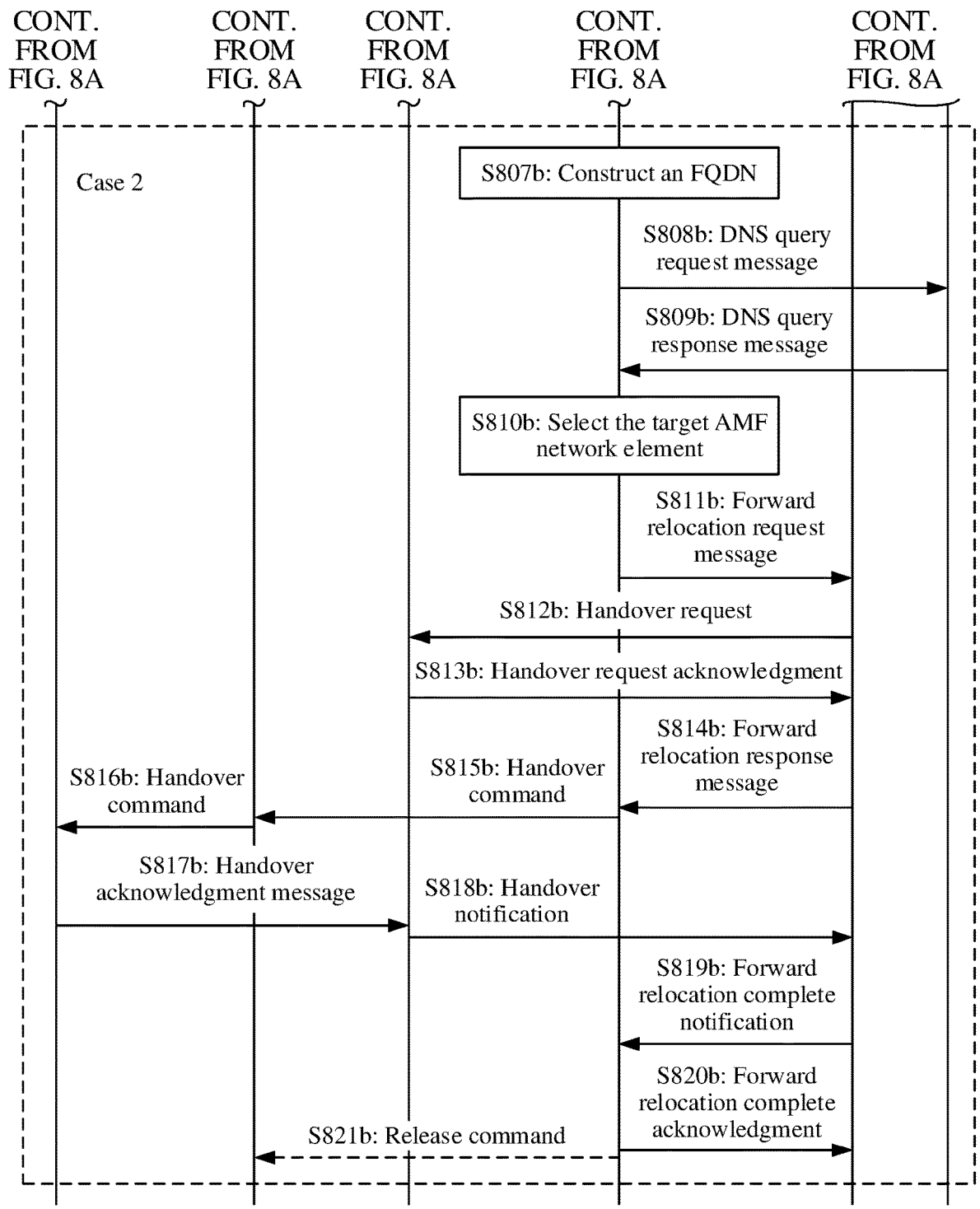

Optionally, for example, in the handover system shown in FIG. 1, the first network is the 4G network and the second network is the 5G network, that is, the NG-AN device is a target device and the E-UTRAN device is a source device. FIG. 8A and FIG. 8B show a handover method according to an embodiment of this application. The handover method includes the following steps:

S801: Optionally, the E-UTRAN device sends an S1 setup request message to a converged network device, so that the converged network device receives the S1 setup request message from the E-UTRAN device.

The S1 setup request message carries an identifier of the E-UTRAN device and an identity of a tracking area served by the E-UTRAN device, and is used to request to register with the converged network device. For related descriptions of the identifier of the E-UTRAN device and the identity of the tracking area served by the E-UTRAN device, refer to the embodiment shown in FIG. 5. Details are not described herein again.

S802: The converged network device sends an S1 setup response (S1 setup response) message to the E-UTRAN device, so that the E-UTRAN device receives the S1 setup response message from the converged network device.

S803: Optionally, the NG-AN device sends an NG setup request message to the converged network device, so that the converged network device receives the NG setup request message from the NG-AN device.

The NG setup request message carries an identifier of the NG-AN device and an identity of a tracking area served by the NG-AN device, and is used to request to register with the converged network device. For related descriptions of the identifier of the NG-AN device and the identity of the tracking area served by the NG-AN device, refer to the embodiment shown in FIG. 7. Details are not described herein again.

S804: The converged network device sends an NG setup request message to the NG-AN device, so that the NG-AN device receives the NG setup response message from the converged network device.

It should be noted that step S801 and step S803 in this embodiment of this application are not performed in a necessary sequence. Step S801 may be performed before step S803; or step S803 may be performed before step S801; or step S801 and step S803 may be performed simultaneously. This is not specifically limited in this embodiment of this application.

S805: The E-UTRAN device sends a handover requirement (handover required) to the converged network device, so that the converged network device receives the handover requirement from the E-UTRAN device.

The handover requirement carries the identifier of the NG-AN device or the identity of the tracking area served by the NG-AN device in FIG. 8A and FIG. 8B.

S806: The converged network device determines, based on the identifier of the NG-AN device or the identity of the tracking area served by the NG-AN device, whether the NG-AN device is managed by the converged network device.

In this embodiment of this application, whether the NG-AN device is managed by the converged network device may be understood as whether a connection is set up between the NG-AN device and the converged network device. This is described herein in a unified manner, and not described again in the following.

Optionally, the converged network device may match the identifier that is of the NG-AN device and that is carried in the handover requirement, to an identifier that is of each NG-AN device connected to the converged network device and that is reported in an NG-AN device registration procedure by the NG-AN device. If the matching succeeds, for example, the identifier that is of each NG-AN device connected to the converged network device and that is reported in the NG-AN device registration procedure by the NG-AN device includes the identifier that is of the NG-AN device and that is carried in the handover requirement, it may be determined that the NG-AN device in FIG. 8A and FIG. 8B is managed by the converged network device.

Alternatively, optionally, the converged network device may match the identity that is of the tracking area served by the NG-AN device and that is carried in the handover requirement, to an identity that is of a tracking area served by each NG-AN device connected to the converged network device and that is reported in an NG-AN device registration procedure by the NG-AN device. If the matching succeeds, for example, the identity that is of the tracking area served by each NG-AN device connected to the converged network device and that is reported in the NG-AN device registration procedure by the NG-AN device includes the identity that is of the tracking area served by the NG-AN device and that is carried in the handover requirement, it may be determined that the NG-AN device in FIG. 8A and FIG. 8B is managed by the converged network device.

Otherwise, the converged network device may determine that the NG-AN device in FIG. 8A and FIG. 8B is not managed by the converged network device.

When the converged network device determines that the NG-AN device is managed by the converged network device, the handover method provided in this embodiment of this application further includes the following steps S807a to S813a.

S807a: The converged network device sends a handover request to the NG-AN device, so that the NG-AN device receives the handover request from the converged network device. The handover request is used to request the NG-AN device to prepare a related resource for a terminal.

S808a: The NG-AN device sends a handover request acknowledgement to the converged network device, so that the converged network device receives the handover request acknowledgement from the NG-AN device.

S809a: The converged network device sends a handover command to the E-UTRAN device, so that the E-UTRAN device receives the handover command from the converged network device. The handover command is used to instruct to hand over the terminal to the NG-AN device.

S810a: The E-UTRAN device sends the handover command to the terminal, so that the terminal receives the handover command from the E-UTRAN device.

S811a: After the terminal is handed over to the NG-AN device, the terminal sends a handover acknowledgement (handover confirm) message to the NG-AN device, so that the NG-AN device receives the handover acknowledgement message from the terminal.

The handover acknowledgement message is used to indicate that the terminal is handed over to the NG-AN device.

S812a: The NG-AN device sends a handover notification (handover notify) to the converged network device, so that the converged network device receives the handover notification from the NG-AN device. The handover notification is used to indicate that the terminal is handed over to the NG-AN device.

S813a: Optionally, the converged network device sends a release command to the E-UTRAN device, so that the E-UTRAN device receives the release command from the converged network device. The release command is used to instruct to release a related resource of the terminal.

Further, the E-UTRAN device may release the related resource of the terminal based on the release command. This is not specifically limited in this embodiment of this application.

Alternatively, when the converged network device determines that the NG-AN device is not managed by the converged network device, the handover method provided in this embodiment of this application further includes the following steps S807b to S821b.

S807b: The converged network device constructs a fully qualified domain name (FQDN). The FQDN is used to query address information of a candidate AMF network element in the 5G network.

For example, the converged network device may construct the FQDN in the following manners:

Manner 1: The converged network device may construct an FQDN 1 based on the identifier of the NG-AN device. The FQDN 1 includes the identifier of the NG-AN device. A format of the FQDN 1 may be an FQDN format corresponding to the identifier of the NG-AN device in the 5G network, which is shown as follows:

rannode<AN device ID>. rannode.5g.mnc<MNC>.mcc<MCC>.3gppnetwork.org;
query parameter: "x-3gpp-amf:x-n26".

Manner 2: The converged network device may construct an FQDN 2 based on the identity of the tracking area served by the NG-AN device. The FQDN 2 includes the identity of the tracking area served by the NG-AN device. A format of the FQDN 2 may be an FQDN format corresponding to the identity of the tracking area served by the NG-AN device in the 5G network, which is shown as follows:

tac-lb<TAC-low-byte>.tac-mb<TAC-middle-byte>.tac-hb<TAC-high-byte>.tac.5g.mnc<MNC>.mcc<MCC>.3gppnetwork.org;
query parameter: "x-3gpp-amf:x-n26".

Manner 3: The converged network device may construct an FQDN 3 based on the identifier of the NG-AN device. The FQDN 3 includes the identifier of the NG-AN device. A format of the FQDN 3 may be an FQDN format corresponding to the identifier of the E-UTRAN device in the 4G network, which is shown as follows:

enb<eNodeB-ID>.enb.epc.mnc<MNC>.mcc<MCC>.3gppnetwork.org;
query parameter: "x-3gpp-mme:x-s10".

Herein, the "eNodeB-ID" is filled with an AN device ID in a global AN device ID.

Manner 4: The converged network device may construct an FQDN 4 based on the identity of the tracking area served by the NG-AN device. The FQDN 4 includes the identity of the tracking area served by the NG-AN device. A format of the FQDN 4 may be an FQDN format corresponding to the identity of the tracking area served by the E-UTRAN device in the 4G network, which is shown as follows:

tac-lb<TAC-low-byte>.tac-hb<TAC-high-byte>.tac.epc.mnc<MNC>.mcc<MCC>.3gppnetwork.org;
query parameter: "x-3gpp-mme:x-s10".

Herein, the "TAC-low-byte" is filled with one low-order byte of a TAC field in the 5G-TAI, and the "TAC-high-byte" is filled with two high-order bytes of the TAC field in the 5G-TAI.

Manner 5: The converged network device may construct an FQDN 5 based on the identity of the tracking area served by the NG-AN device. The FQDN 5 includes an MCC, an MNC, and 16 low-order bits (that is, two low-order bytes) of a TAC in the identity of the tracking area served by the NG-AN device. A format of the FQDN 5 may be an FQDN format corresponding to the identity of the tracking area served by the E-UTRAN device in the 4G network, which is shown as follows:

tac-lb<TAC-low-byte>.tac-hb<TAC-high-byte>.tac.epc.mnc<MNC>.mcc<MCC>.3gppnetwork.org;
query parameter: "x-3gpp-mme:x-s10".

Herein, the "TAC-low-byte" is filled with a lowest-order byte of a TAC field in the 5G-TAI, and the "TAC-high-byte" is filled with a middle-order byte of the TAC field in the 5G-TAI. A highest-order byte of the TAC field in the 5G-TAI is directly discarded.

In a possible implementation, in this embodiment of this application, the 4G-TAI and the 5G-TAI may be configured in a unified manner. In this way, in a case of a group of MNC+MCC, 16 low-order bits of a TAC field in any 4G-TAI cannot be the same as 16 low-order bits of a TAC field in any 5G-TAI, and eight high-order bits of a TAC field in each of different 5G-TAIs may be set to invalid bits or all same values. In this way, when the address information of the candidate AMF network element in the 5G network is determined, address information of a group of candidate AMF network elements may be uniquely queried based on 16 low-order bits of an MNC+MCC+TAC field in the 5G-TAI. This is not specifically limited in this embodiment of this application.

Figure 9:
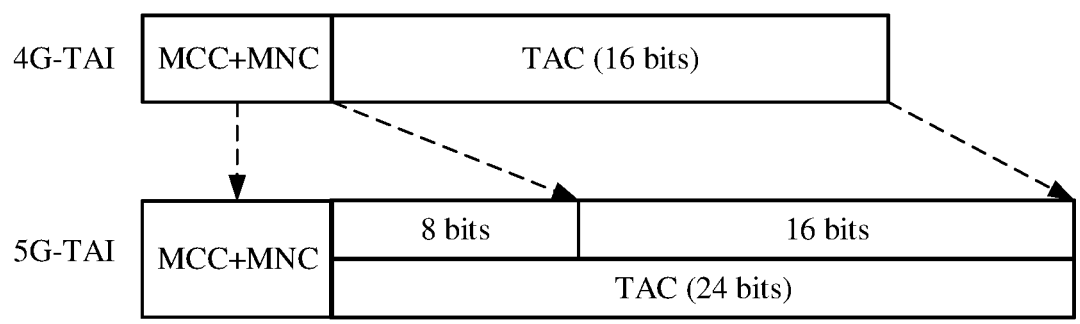
FIG. 9 is a schematic diagram of a mapping relationship between a 4G-TAI and a 5G-TAI according to an embodiment of this application.

Alternatively, in a possible implementation, in this embodiment of this application, if an overlapping wireless coverage area between the 4G network and the 5G network is served by the converged network device during network deployment, the 4G-TAI and the 5G-TAI may be configured in a unified manner. In this way, as shown in FIG. 9, in a case of a group of MNC+MCC, 16 low-order bits of a TAC field in a 4G-TAI corresponding to the converged network device are the same as 16 low-order bits of a TAC field in a 5G-TAI corresponding to the same converged network device, and eight high-order bits of a TAC field in each of different 5G-TAIs may be set to invalid bits or all same values. In this way, when the address information of the candidate AMF network element in the 5G network is determined, the address information of the candidate AMF network element in the 5G network may be uniquely determined based on 16 low-order bits of an MNC+MCC+TAC field in the 5G-TAI. The address information of the candidate AMF network element is actually also address information of a candidate converged network device. This is not specifically limited in this embodiment of this application.

S808b: The converged network device sends a DNS query request message to a domain name system (DNS) server, so that the DNS server receives the DNS query request message from the converged network device. The DNS query request message carries the foregoing FQDN, and is used to request to query the address information of the candidate AMF network element.

Optionally, for Manner 1 or Manner 3 of step S807b, the DNS server may store a first correspondence between an identifier of each of different NG-AN devices and address information of a corresponding candidate AMF network element. Further, after the DNS server obtains the identifier of the NG-AN device, the DNS server may determine the address information of the corresponding candidate AMF network element based on the identifier of the NG-AN device and the stored first correspondence.

Alternatively, optionally, for Manner 2 or Manner 4 of step S807b, the DNS server may store a second correspondence between an identity of a tracking area served by each of different NG-AN devices and address information of a corresponding candidate AMF network element. Further, after the DNS server obtains the identity of the tracking area served by the NG-AN device, the DNS server may determine the address information of the corresponding candidate AMF network element based on the identity of the tracking area served by the NG-AN device and the stored second correspondence.

Alternatively, optionally, for Manner 5 of step S807b, the DNS server may store a third correspondence between a part of a field (for example, 16 low-order bits of MNC+MCC+TAC) in an identity of a tracking area served by each of different NG-AN devices and address information of a corresponding candidate AMF network element. Further, after the DNS server obtains the part of the field (for example, 16 low-order bits of MNC+MCC+TAC) in the identity of the tracking area served by the NG-AN device, the DNS server may determine the address information of the corresponding candidate AMF network element based on the part of the field (for example, 16 low-order bits of MNC+MCC+TAC) in the identity of the tracking area served by the NG-AN device and the stored third correspondence.

Optionally, in this embodiment of this application, the DNS server may not only determine the address information of the candidate AMF network element in the foregoing manner, but also similarly determine an identifier of the candidate AMF network element, for example, a group of globally unique AMF identifiers (GUAMI). This is not specifically limited in this embodiment of this application.

S809b: The DNS server sends a DNS query response message to the converged network device, so that the converged network device receives the DNS query response message from the DNS server. The DNS query response message carries address information of a group of candidate AMF network elements.

Optionally, the DNS query response message carries identifiers of a group of candidate AMF network elements. This is not specifically limited in this embodiment of this application.

S810b: The converged network device selects address information of a target AMF network element in the 5G network from the address information of the candidate AMF network element. It is assumed that the target AMF network element may be shown in FIG. 8A and FIG. 8B.

S811b: The converged network device sends a forward relocation request message to the target AMF network element, so that the target AMF network element receives the forward relocation request message from the converged network device. The forward relocation request message carries a 4G context of the terminal, and is used to request the target AMF network element to prepare a related resource for the terminal.

Steps S812b and S813b are similar to steps S807a and S808a. For example, a difference is that the converged network device in steps S807a and S808a is replaced with the target AMF network element in steps S812b and S813b. For other related descriptions, refer to steps S807a and S808a. Details are not described herein again.

S814b: The target AMF network element sends a forward relocation response message to the converged network device, so that the converged network device receives the forward relocation response message from the target AMF network element.

Steps S815b to S817b are the same as steps S809a to S811a. For related descriptions, refer to steps S809a to S811a. Details are not described herein again.

Step S818b is similar to step S812a. For example, a difference is that the converged network device in step S812a is replaced with the target AMF network element in step S818b. For other related descriptions, refer to step S812a. Details are not described herein again.

S819b: The target AMF network element sends a forward relocation complete notification to the converged network device, so that the converged network device receives the forward relocation complete notification from the target AMF network element. The forward relocation complete notification is used to indicate that the converged network device can release a related resource of the terminal.

S820b: The converged network device sends a forward relocation complete acknowledgement to the target AMF network element, so that the target AMF network element receives the forward relocation complete acknowledgement from the converged network device.

Step S821b is the same as step S813a. For other related descriptions, refer to step S813a. Details are not described herein again.

Based on the handover method provided in this embodiment of this application, not only a handover procedure of the terminal can be simplified, but also handover of the terminal from the 4G network to the 5G network can be implemented. For analysis on related technical effects, refer to related descriptions in the part of the handover system. Details are not described herein again.

The actions of the converged network device in steps S801 to S813a or to S821b may be performed in a manner in which the processor 301 in the communications device 300 shown in FIG. 3 invokes the application program code stored in the memory 303. This is not limited in this embodiment of this application.

Figure 10A:
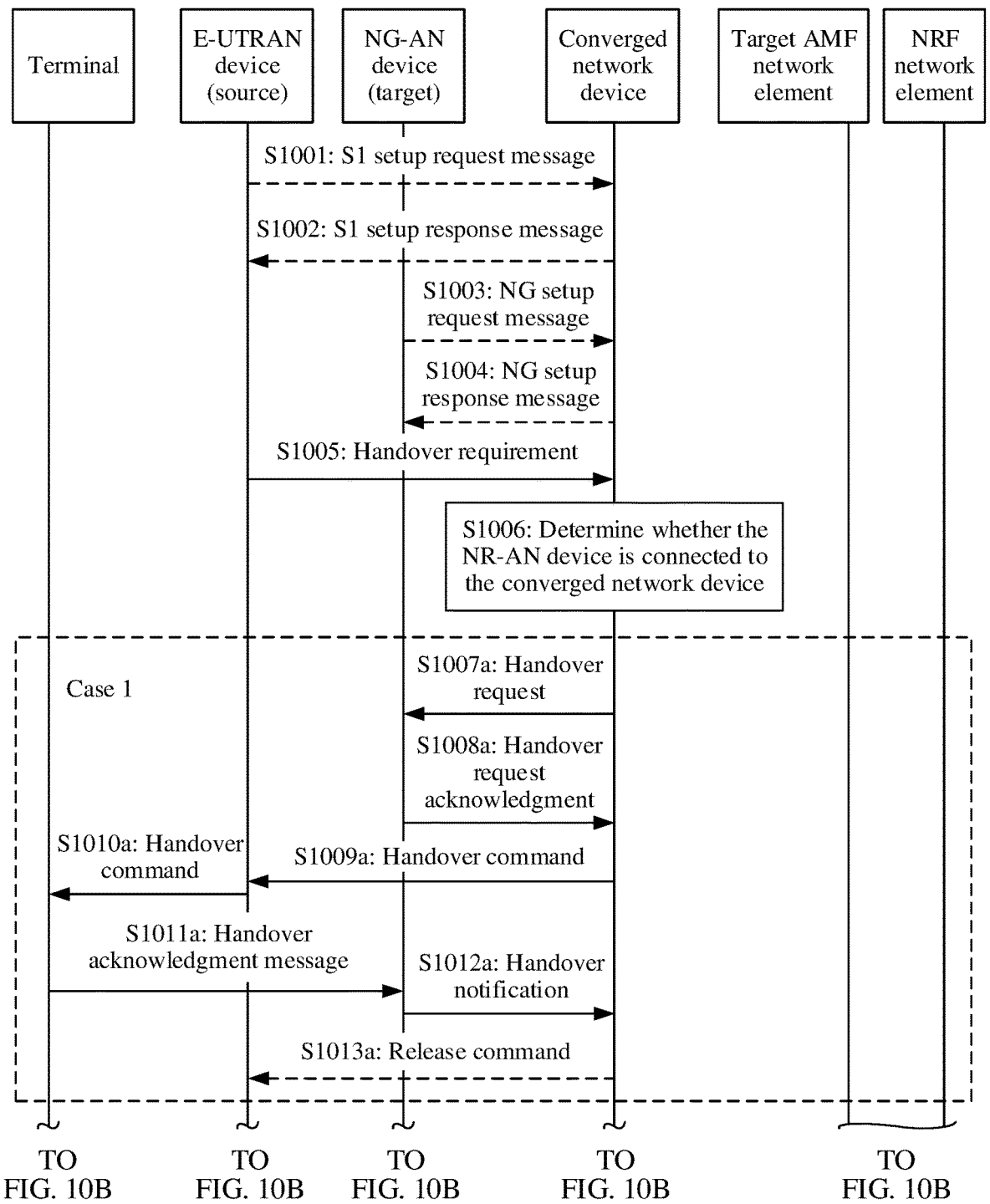
FIG. 10A and FIG. 10B are a schematic flowchart 2 of a handover method according to an embodiment of this application.
Figure 10B:
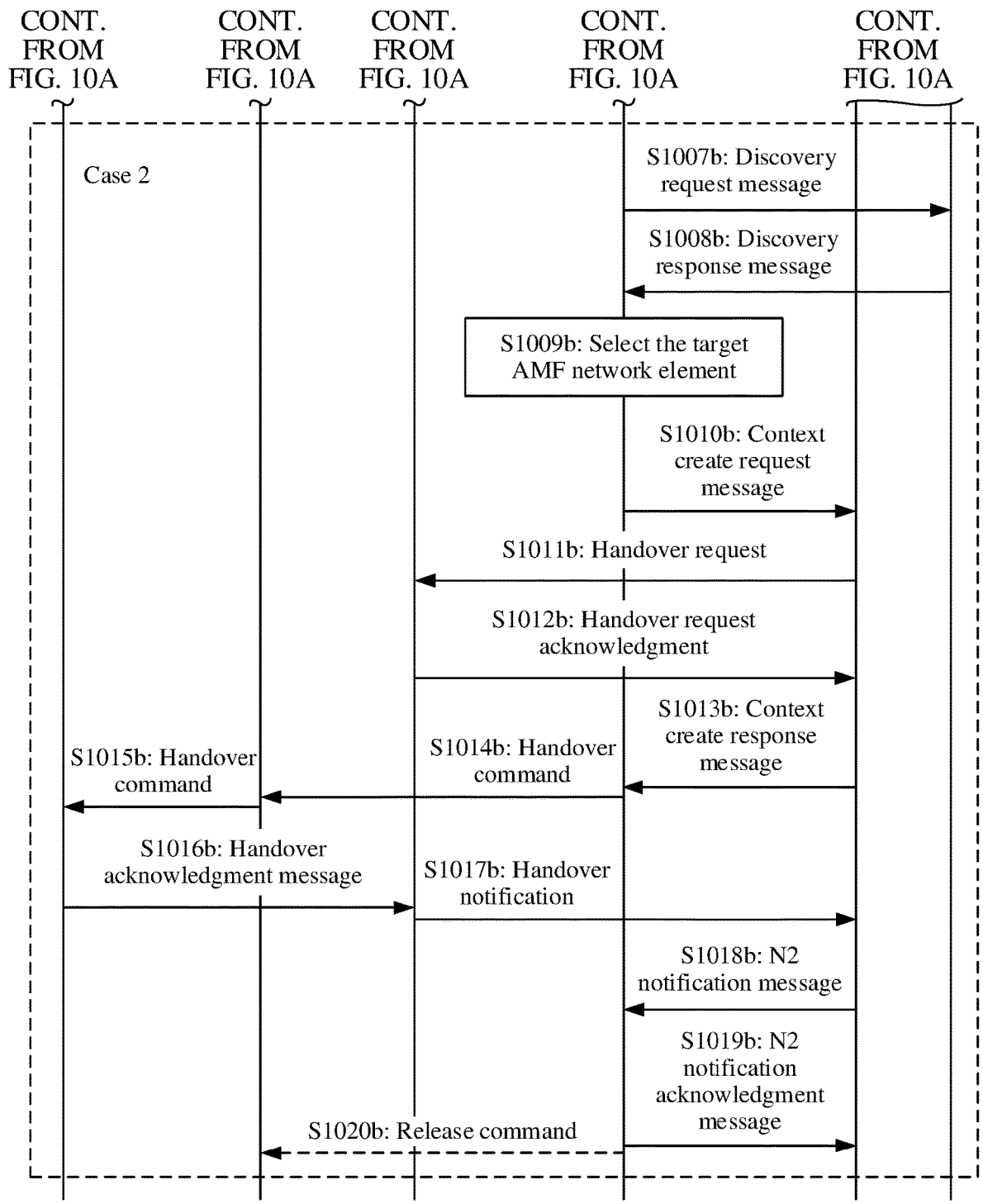

Optionally, for example, in the handover system shown in FIG. 1, the first network is the 4G network and the second network is the 5G network, that is, the NG-AN device is a target device and the E-UTRAN device is a source device. FIG. 10A and FIG. 10B show a handover method according to an embodiment of this application. The handover method includes the following steps.

Steps S1001 to S1006 are the same as steps S801 to S806. For related descriptions, refer to the embodiment shown in FIG. 8A and FIG. 8B. Details are not described herein again.

When the converged network device determines that the NG-AN device is managed by the converged network device, the handover method provided in this embodiment of this application further includes the following steps S1007a to S1013a.

Steps S1007a to S1013a are the same as steps S807a to S813a. For related descriptions, refer to the embodiment shown in FIG. 8A and FIG. 8B. Details are not described herein again.

Alternatively, when the converged network device determines that the NG-AN device is not managed by the converged network device, the handover method provided in this embodiment of this application further includes the following steps S1007b to S1020b.

S1007b: The converged network device sends a discovery request message to a network discovery function (network repository function, NRF) network element, so that the NRF network element receives the discovery request message from the converged network device. The discovery request message carries an identifier of the NG-AN device or an identity of a tracking area served by the NG-AN device, and is used to request to query address information of a candidate AMF network element.

The NRF network element may store a first correspondence between an identifier of each of different NG-AN devices and address information of a corresponding candidate AMF network element. Further, after the NRF network element obtains the identifier of the NG-AN device, the NRF network element may determine the address information of the corresponding candidate AMF network element based on the identifier of the NG-AN device and the stored first correspondence.

Alternatively, the NRF network element may store a second correspondence between an identity of a tracking area served by each of different NG-AN devices and address information of a corresponding candidate AMF network element. Further, after the NRF network element obtains the identity of the tracking area served by the NG-AN device, the NRF network element may determine the address information of the corresponding candidate AMF network element based on the identity of the tracking area served by the NG-AN device and the stored second correspondence.

Optionally, in this embodiment of this application, the NRF network element may not only determine the address information of the candidate AMF network element in the foregoing manner, but also similarly determine an identifier of the candidate AMF network element, for example, a group of GUAMIs. This is not specifically limited in this embodiment of this application.

S1008b: The NRF network element sends a discovery response message to the converged network device, so that the converged network device receives the discovery response message from the NRF network element. The discovery response message carries address information of a group of candidate AMF network elements.

Optionally, the discovery response message carries identifiers of a group of candidate AMF network elements. This is not specifically limited in this embodiment of this application.

Step S1009b is the same as step S810b. For related descriptions, refer to the embodiment shown in FIG. 8A and FIG. 8B. Details are not described herein again.

S1010b: The converged network device sends a context create request (create context request) message to a target AMF network element, so that the target AMF network element receives the context create request message from the converged network device. The context create request message carries a 5G context converted from a 4G context of a terminal, and is used to request the target AMF network element to prepare a related resource for the terminal.

Steps S1011b and S1012b are the same as steps S812b and S813b. For related descriptions, refer to the embodiment shown in FIG. 8A and FIG. 8B. Details are not described herein again.

S1013b: The target AMF network element sends a context create response (create context response) message to the converged network device, so that the converged network device receives the context create response message from the target AMF network element.

Steps S1014b to S1017b are the same as steps S815b to S818b. For related descriptions, refer to the embodiment shown in FIG. 8A and FIG. 8B. Details are not described herein again.

S1018b: The target AMF network element sends an N2 notification message to the converged network device, so that the converged network device receives the N2 notification message from the target AMF network element. The N2 notification message is used to indicate that the converged network device can release a related resource of the terminal.

S1019b: The converged network device sends an N2 notification acknowledgement message to the target AMF network element, so that the target AMF network element receives the N2 notification acknowledgement message from the converged network device.

Step S1020b is the same as step S821b. For related descriptions, refer to the embodiment shown in FIG. 8A and FIG. 8B. Details are not described herein again.

Based on the handover method provided in this embodiment of this application, not only a handover procedure of the terminal can be simplified, but also handover of the terminal from the 4G network to the 5G network can be implemented. For analysis on related technical effects, refer to related descriptions in the part of the handover system. Details are not described herein again.

The actions of the converged network device in steps S1001 to S1013a or to S1020b may be performed in a manner in which the processor 301 in the communications device 300 shown in FIG. 3 invokes the application program code stored in the memory 303. This is not limited in this embodiment of this application.

Optionally, the embodiment shown in FIG. 8A and FIG. 8B or FIG. 10A and FIG. 10B is described by using an example in which the handover requirement sent by the E-UTRAN device to the converged network device carries the identifier of the NG-AN device or the identity of the tracking area served by the NG-AN device in FIG. 8A and FIG. 8B. Certainly, the handover requirement sent by the E-UTRAN device to the converged network device may alternatively carry an identifier of the E-UTRAN device or an identity of a tracking area served by the E-UTRAN device. For a corresponding handover method, refer to an existing 4G handover procedure. In this case, a source MME in the 4G network needs to be replaced with the converged network device in this embodiment of this application. Details are not described herein.

Figure 11A:
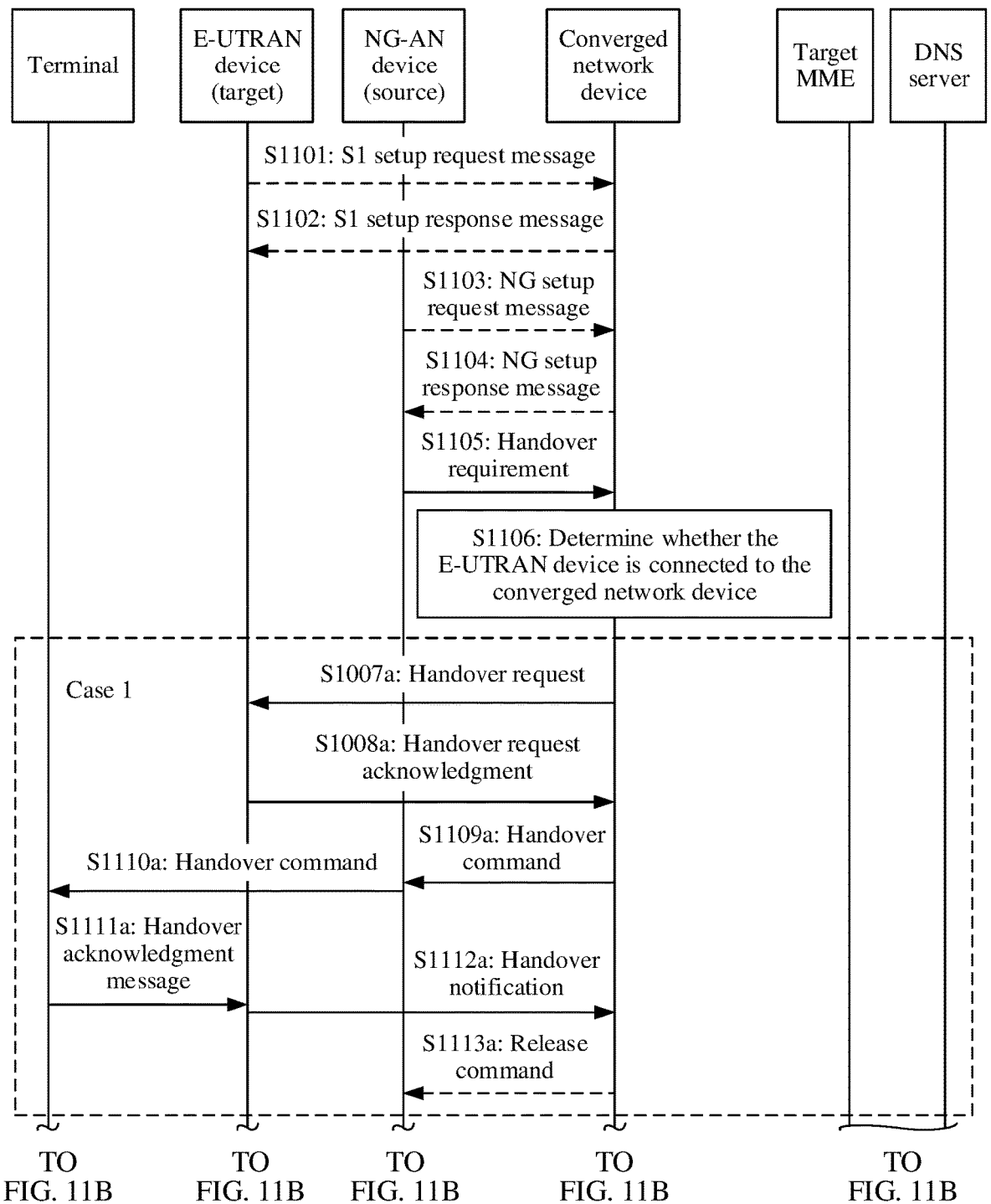
FIG. 11A and FIG. 11B are a schematic flowchart 3 of a handover method according to an embodiment of this application.
Figure 11B:
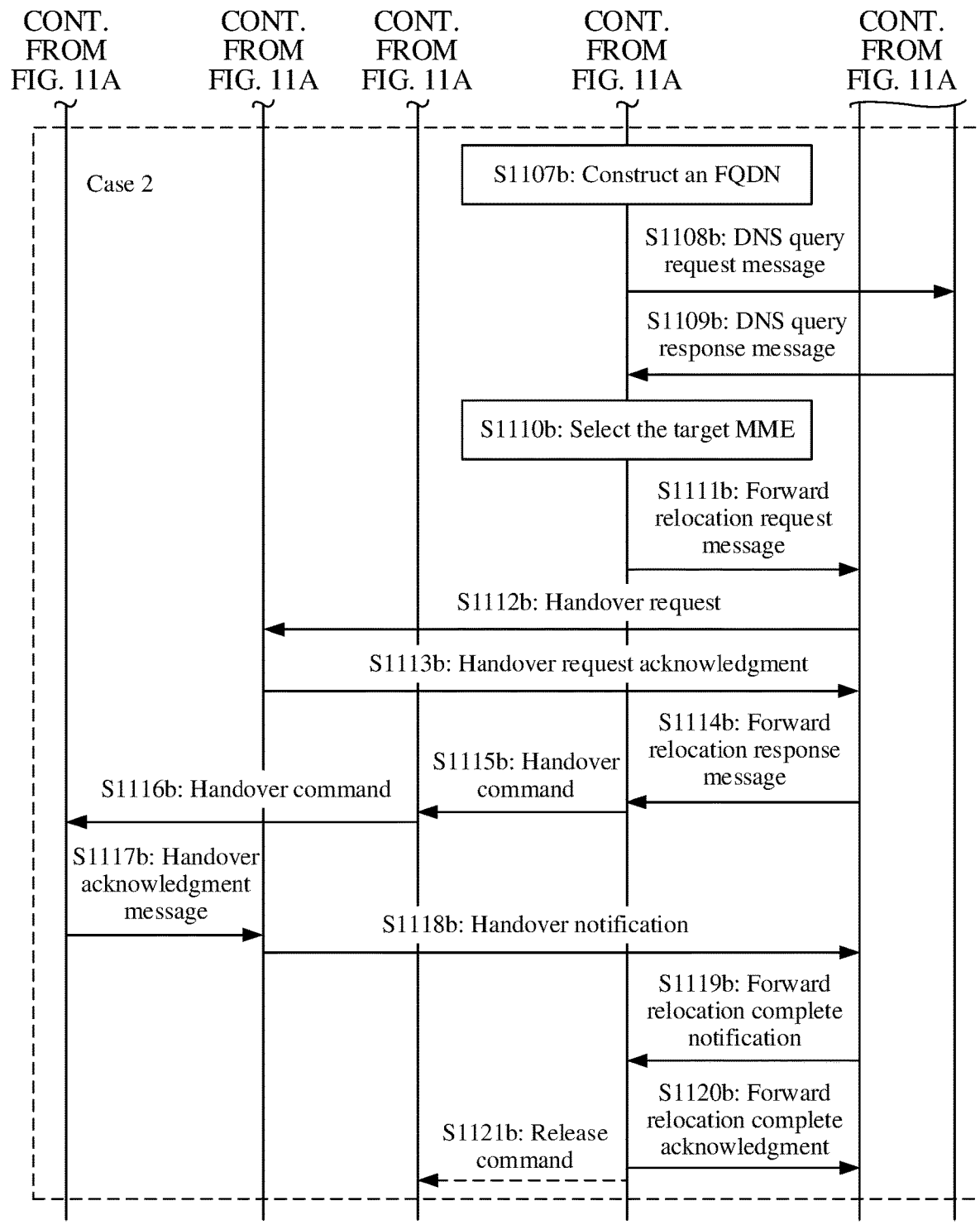

Optionally, for example, in the handover system shown in FIG. 1, the first network is the 5G network and the second network is the 4G network, that is, the NG-AN device is a source device and the E-UTRAN device is a target device. FIG. 11A and FIG. 11B show a handover method according to an embodiment of this application. The handover method includes the following steps:

Steps S1101 to S1104 are the same as steps S801 to S84. For related descriptions, refer to the embodiment shown in FIG. 8A and FIG. 8B. Details are not described herein again.

S1105: The NG-AN device sends a handover requirement to the converged network device, so that the converged network device receives the handover requirement from the NG-AN device.

The handover requirement carries an identifier of the E-UTRAN device or an identity of a tracking area served by the E-UTRAN device in FIG. 11A and FIG. 11B.

S1106: The converged network device determines, based on the identifier of the E-UTRAN device or the identity of the tracking area served by the E-UTRAN device, whether the E-UTRAN device is managed by the converged network device.

In this embodiment of this application, whether the E-UTRAN device is managed by the converged network device may be understood as whether a connection is set up between the E-UTRAN device and the converged network device. This is described herein in a unified manner, and not described again in the following.

Optionally, the converged network device may match the identifier that is of the E-UTRAN device and that is carried in the handover requirement, to an identifier that is of each E-UTRAN device connected to the converged network device and that is reported in an E-UTRAN device registration procedure by the E-UTRAN device. If the matching succeeds, for example, the identifier that is of each E-UTRAN device connected to the converged network device and that is reported in the E-UTRAN device registration procedure by the E-UTRAN device includes the identifier that is of the E-UTRAN device and that is carried in the handover requirement, it may be determined that the E-UTRAN device in FIG. 11A and FIG. 11B is managed by the converged network device.

Alternatively, optionally, the converged network device may match the identity that is of the tracking area served by the E-UTRAN device and that is carried in the handover requirement, to an identity that is of a tracking area served by each E-UTRAN device connected to the converged network device and that is reported in an E-UTRAN device registration procedure by the E-UTRAN device. If the matching succeeds, for example, the identity that is of the tracking area served by each E-UTRAN device connected to the converged network device and that is reported in the E-UTRAN device registration procedure by the NG-AN device includes the identity that is of the tracking area served by the E-UTRAN device and that is carried in the handover requirement, it may be determined that the E-UTRAN device in FIG. 11A and FIG. 11B is managed by the converged network device.

Otherwise, the converged network device may determine that the E-UTRAN device in FIG. 11A and FIG. 11B is not managed by the converged network device.

When the converged network device determines that the E-UTRAN device is managed by the converged network device, the handover method provided in this embodiment of this application further includes the following steps S1107a to S13a.

Steps S1107a and S1108a are similar to steps S807a and S808a. For example, a difference is that the NG-AN device in steps S807a and S808a is replaced with the E-UTRAN device in steps S1107a and S1108a. For other related descriptions, refer to the embodiment shown in FIG. 8A and FIG. 8B. Details are not described herein again.

Steps S1019a and S110a are similar to steps S809a and S810a. For example, a difference is that the E-UTRAN device in steps S809a and S810a is replaced with the NG-AN device in steps S1019a and S110a. For other related descriptions, refer to the embodiment shown in FIG. 8A and FIG. 8B. Details are not described herein again.

Steps S1111a and S1112a are similar to steps S811a and S812a. For example, a difference is that the NG-AN device in steps S811a and S812a is replaced with the E-UTRAN device in steps S111a and S1112a. For other related descriptions, refer to the embodiment shown in FIG. 8A and FIG. 8B. Details are not described herein again.

S1113a: Optionally, the converged network device sends a release command to the NG-AN device, so that the NG-AN device receives the release command from the converged network device. The release command is used to instruct to release a related resource of a terminal.

Further, the NG-AN device may release the related resource of the terminal based on the release command. This is not specifically limited in this embodiment of this application.

Alternatively, when the converged network device determines that the E-UTRAN device is not managed by the converged network device, the handover method provided in this embodiment of this application further includes the following steps S1107b to S1121b.

S1107b: The converged network device constructs a fully qualified domain name. The FQDN is used to query address information of a candidate MME network element in the 4G network.

For example, the converged network device may construct the FQDN in the following manners:

Manner 1: The converged network device may construct an FQDN 6 based on the identifier of the E-UTRAN device. The FQDN 6 includes the identifier of the E-UTRAN device. A format of the FQDN 6 is shown as follows:

--- enb<eNodeB-ID>.enb.epc.mnc<MNC>.mcc<MCC>.3gppnetwork.org; query parameter: "x-3gpp-mme:x-s10".

---

Manner 2: The converged network device may construct an FQDN 7 based on the identity of the tracking area served by the E-UTRAN device. The FQDN 7 includes the identity of the tracking area served by the E-UTRAN device. A format of the FQDN 7 is as follows:

--- tac-lb<TAC-low-byte>.tac-hb<TAC-high-byte>.tac.epc.mnc<MNC>.mcc<MCC>.3gppnetwork.org; query parameter: "x-3gpp-mme:x-s10".

---

S1108b: The converged network device sends a DNS query request message to a DNS server, so that the DNS server receives the DNS query request message from the converged network device. The DNS query request message carries the foregoing FQDN, and is used to request to query the address information of the candidate MME.

Optionally, for Manner 1 of step S1007b, the DNS server may store a fourth correspondence between an identifier of each of different E-UTRAN devices and address information of a corresponding candidate MME. Further, after the DNS server obtains the identifier of the E-UTRAN device, the DNS server may determine the address information of the corresponding candidate MME based on the identifier of the E-UTRAN device and the stored fourth correspondence.

Alternatively, optionally, for Manner 2 of step S1007b, the DNS server may store a fifth correspondence between an identity of a tracking area served by each of different E-UTRAN devices and address information of a corresponding candidate MME. Further, after the DNS server obtains the identity of the tracking area served by the E-UTRAN device, the DNS server may determine the address information of the corresponding candidate MME based on the identity of the tracking area served by the E-UTRAN device and the stored fifth correspondence.

Optionally, in this embodiment of this application, the DNS server may not only determine the address information of the candidate MME in the foregoing manner, but also similarly determine an identifier of the candidate MME, for example, a group of globally unique MME identifiers (globally unique MME identifier, GUMMEI). This is not specifically limited in this embodiment of this application.

S1109b: The DNS server sends a DNS query response message to the converged network device, so that the converged network device receives the DNS query response message from the DNS server. The DNS query response message carries address information of a group of candidate MMEs.

Optionally, the DNS query response message carries identifiers of a group of candidate MMEs. This is not specifically limited in this embodiment of this application.

S1110b: The converged network device selects address information of a target MME in the 4G network from the address information of the candidate MME. It is assumed that the target MME may be shown in FIG. 11A and FIG. 11B.

Steps S111b to S1114b are similar to steps S811b to S814b. For example, a difference is that, the target AMF network element in steps S81b to S814b is replaced with the target MME in steps S1111b to S1114b, and the NG-AN device in steps S81b to S814b is replaced with the E-UTRAN device in steps S1111b to S1114b. For other related descriptions, refer to the embodiment shown in FIG. 8A and FIG. 8B. Details are not described herein again.

Steps S1115b and S16b are similar to steps S815a and S816a. For example, a difference is that the E-UTRAN device in steps S815a and S816a is replaced with the NG-AN device in steps S1115a and S16a. For other related descriptions, refer to the embodiment shown in FIG. 8A and FIG. 8B. Details are not described herein again.

Steps S1117b and S18b are similar to steps S817b and S818b. For example, a difference is that, the target AMF network element in steps S817b and S818b is replaced with the target MME in steps S1117b and S1118b, and the NG-AN device in steps S817b and S818b is replaced with the E-UTRAN device in steps S1117b and S1118b. For other related descriptions, refer to the embodiment shown in FIG. 8A and FIG. 8B. Details are not described herein again.

Steps S1119b and S1120b are similar to steps S819b and S820b. For example, a difference is that the target AMF network element in steps S819b and S820b is replaced with the target MME in steps S119b and S1120b. For other related descriptions, refer to the embodiment shown in FIG. 8A and FIG. 8B. Details are not described herein again.

Step S121b is the same as step S113a. For other related descriptions, refer to step S113a. Details are not described herein again.

Based on the handover method provided in this embodiment of this application, not only a handover procedure of the terminal can be simplified, but also handover of the terminal from the 5G network to the 4G network can be implemented. For analysis on related technical effects, refer to related descriptions in the part of the handover system. Details are not described herein again.

The actions of the converged network device in steps S1101 to S1113a or to S1121b may be performed in a manner in which the processor 301 in the communications device 300 shown in FIG. 3 invokes the application program code stored in the memory 303. This is not limited in this embodiment of this application.

Optionally, the embodiment shown in FIG. 11A and FIG. 11B is described by using an example in which the handover requirement sent by the NG-AN device to the converged network device carries the identifier of the E-UTRAN device or the identity of the tracking area served by the E-UTRAN device in FIG. 11A and FIG. 11B. Certainly, the handover requirement sent by the NG-AN device to the converged network device may alternatively carry an identifier of the NG-AN device or an identity of a tracking area served by the NG-AN device. For a corresponding handover method, refer to an existing 5G handover procedure. In this case, a source (source) AMF network element in the 5G network needs to be replaced with the converged network device in this embodiment of this application. Details are not described herein.

The foregoing mainly describes the solutions provided in the embodiments of this application from a perspective of interaction between network elements. It may be understood that, to implement the foregoing functions, the converged network device includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the converged network device may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, is merely logical function division, and may be other division in actual implementation.

Figure 12:
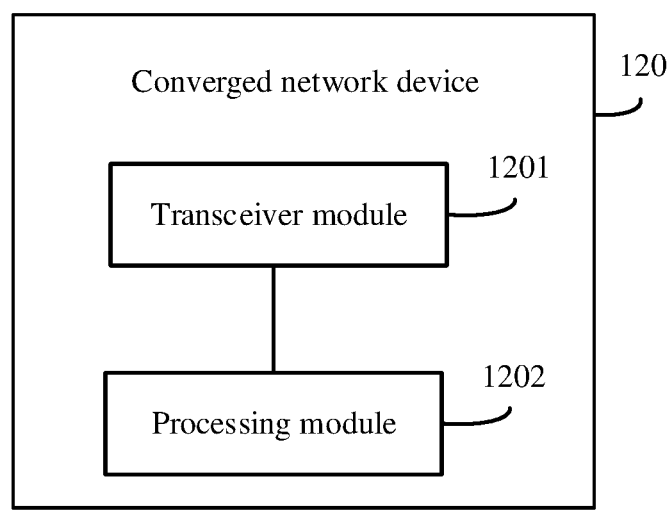
FIG. 12 is a schematic structural diagram of a converged network device according to an embodiment of this application.

For example, when each function module is obtained through division in an integration manner, FIG. 12 is a schematic structural diagram of a converged network device 120. The converged network device 120 includes a transceiver module 1201 and a processing module 1202.

In a possible implementation, the transceiver module 1201 is configured to receive a handover requirement from a first access device in a first network. The handover requirement carries an identifier of a second access device in a second network or an identity of a tracking area served by a second access device. The first network and the second network are different types of networks. The processing module 1202 is configured to determine, based on the identifier of the second access device or the identity of the tracking area served by the second access device, that the second access device is managed by the converged network device 120. The transceiver module 1201 is further configured to send a handover request to the second access device. The handover request is used to request the second access device to prepare a related resource for a terminal. The transceiver module 1201 is further configured to send a handover command to the first access device. The handover command is used to instruct to hand over the terminal to the second access device. The transceiver module 1201 is further configured to receive a handover notification from the second access device. The handover notification is used to indicate that the terminal is handed over to the second access device.

In another possible implementation, the transceiver module 1201 is configured to receive a handover requirement from a first access device in a first network. The handover requirement carries an identifier of a second access device in a second network or an identity of a tracking area served by a second access device. The first network is a 4G network, and the second network is a 5G network. The processing module 1202 is configured to determine, based on the identifier of the second access device or the identity of the tracking area served by the second access device, that the second access device is not managed by the converged network device 120. The processing module 1202 is further configured to: obtain address information of a target mobility management network element in the second network based on the identifier of the second access device or the identity of the tracking area served by the second access device, and relocate to the target mobility management network element based on the address information of the target mobility management network element. The transceiver module 1201 is further configured to send a handover command to the first access device. The handover command is used to instruct the first access device to hand over a terminal to the second access device.

Optionally, that the processing module 1202 is configured to obtain the address information of the target mobility management network element in the second network based on the identifier of the second access device or the identity of the tracking area served by the second access device is specifically: The processing module 1202 is configured to: construct a first fully qualified domain name based on the identifier of the second access device, where the first fully qualified domain name includes the identifier of the second access device; send the first fully qualified domain name to a DNS server, where the first fully qualified domain name is used to determine address information of one or more candidate mobility management network elements in the 5G network; receive the address information of the candidate mobility management network elements in the 5G network from the DNS server; and select the address information of the target mobility management network element in the 5G network from the address information of the candidate mobility management network elements.

Alternatively, optionally, that the processing module 1202 is configured to obtain the address information of the target mobility management network element in the second network based on the identifier of the second access device or the identity of the tracking area served by the second access device is specifically: The processing module 1202 is configured to: construct a second fully qualified domain name based on the identity of the tracking area served by the second access device, where the second fully qualified domain name includes the identity of the tracking area served by the second access device; send the second fully qualified domain name to a DNS server, where the second fully qualified domain name is used to determine address information of one or more candidate mobility management network elements in the 5G network; receive the address information of the candidate mobility management network elements in the 5G network from the DNS server; and select the address information of the target mobility management network element in the 5G network from the address information of the candidate mobility management network elements.

Alternatively, optionally, that the processing module 1202 is configured to obtain the address information of the target mobility management network element in the second network based on the identifier of the second access device or the identity of the tracking area served by the second access device is specifically: The processing module 1202 is configured to: construct a third fully qualified domain name based on the identity of the tracking area served by the second access device, where the third fully qualified domain name includes an MCC, an MNC, and 16 low-order bits of a TAC in the identity of the tracking area served by the second access device, and a format of the third fully qualified domain name is a fully qualified domain name format corresponding to an identity of a tracking area in the 4G network; send the third fully qualified domain name to a DNS server, where the third fully qualified domain name is used to query address information of one or more candidate mobility management network elements in the 5G network; receive the address information of the candidate mobility management network elements in the 5G network from the DNS server; and select the address information of the target mobility management network element in the 5G network from the address information of the candidate mobility management network elements.

In the foregoing case, that the processing module 1202 is configured to relocate to the target mobility management network element based on the address information of the target mobility management network element is specifically: The processing module 1202 is configured to send a forward relocation request message to the target mobility management network element. The forward relocation request message carries a 4G context of the terminal, and is used to request the target mobility management network element to prepare a resource for the terminal.

Alternatively, optionally, that the processing module 1202 is configured to obtain the address information of the target mobility management network element in the second network based on the identifier of the second access device or the identity of the tracking area served by the second access device is specifically: The processing module 1202 is configured to: send the identifier of the second access device or the identity of the tracking area served by the second access device to a network repository function network element, where the identifier of the second access device or the identity of the tracking area served by the second access device is used to query address information of one or more candidate mobility management network elements in the 5G network; receive the address information of the candidate mobility management network elements in the 5G network from the network repository function network element; and select the address information of the target mobility management network element in the 5G network from the address information of the candidate mobility management network elements.

In the foregoing case, that the processing module 1202 is configured to relocate to the target mobility management network element based on the address information of the target mobility management network element is specifically: The processing module 1202 is configured to send a context create request message to the target mobility management network element. The context create request message carries a 5G context converted from a 4G context of the terminal, and is used to request the target mobility management network element to prepare a resource for the terminal.

In the foregoing case, the transceiver module 1201 is further configured to receive an N2 notification message from the target mobility management network element, where the N2 notification message is used to indicate the converged network device 120 to release a related resource of the terminal; and the processing module 1202 is further configured to release the related resource of the terminal based on the N2 notification message.

All content related to the steps in the foregoing method embodiments may be cited in function descriptions of corresponding function modules. Details are not described herein.

In this embodiment, the converged network device 120 is presented in a form of function modules obtained through division in an integration manner. Herein, the "module" may be a specific ASIC, a circuit, a processor and a memory for executing one or more software or firmware programs, an integrated logic circuit, and/or another component that can provide the foregoing functions. In a simple embodiment, a person skilled in the art may figure out that the converged network device 120 may use a form shown in FIG. 3.

For example, the processor 301 in FIG. 3 may invoke the computer execution instruction stored in the memory 303, so that the converged network device 120 performs the handover method in the foregoing method embodiments.

Specifically, the functions/implementation processes of the transceiver module 1201 and the processing module 1202 in FIG. 12 may be implemented by the processor 301 in FIG. 3 by invoking the computer execution instruction stored in the memory 303. Alternatively, the function/implementation process of the processing module 1202 in FIG. 12 may be implemented by the processor 301 in FIG. 3 by invoking the computer execution instruction stored in the memory 303, and the function/implementation process of the transceiver module 1201 in FIG. 12 may be implemented by using the communications interface 304 in FIG. 3.

Because the converged network device provided in this embodiment may perform the foregoing handover method, for a technical effect that can be obtained by the converged network device, refer to the foregoing method embodiments. Details are not described herein again.

Optionally, an embodiment of this application further provides an apparatus (for example, the apparatus may be a chip system). The apparatus includes a processor, configured to support a converged network device in implementing the foregoing handover method, for example, determining, based on an identifier of a second access device or an identity of a tracking area served by a second access device, that the second access device is managed by the converged network device. In a possible design, the apparatus further includes a memory. The memory is configured to store a program instruction and data required by the converged network device. Certainly, the memory may be not in the apparatus. When the apparatus is a chip system, the apparatus may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, the word "comprising" does not exclude another component or another step, and "a/an" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, clearly, various modifications and combinations may be made to them without departing from the spirit and scope of this application. Correspondingly, the specification and the accompanying drawings are merely example descriptions of this application defined by the accompanying claims, and are intended to cover any or all of modifications, variations, combinations or equivalents within the scope of this application. Clearly, a person skilled in the art can make various modifications and variations to this application without departing from the spirit and scope of this application. This application is intended to cover these modifications and variations of this application provided that they fall within the scope of the claims in this application and their equivalent technologies.

What is claimed is:

1. A method, comprising:
    receiving, by a network device, a handover requirement from a first access device in a first network, wherein the handover requirement carries an identifier of a second access device in a second network or an identity of a tracking area served by the second access device, the first network is a 4th generation (4G) network, and the second network is a 5th generation (5G) network;
    determining, by the network device based on the identifier of the second access device or the identity of the tracking area served by the second access device, that the second access device is not managed by the network device;

obtaining, by the network device, address information of a target mobility management network element in the second network based on the identifier of the second access device or the identity of the tracking area served by the second access device, and relocating to the target mobility management network element based on the address information of the target mobility management network element; and sending, by the network device, a handover command to the first access device, wherein the handover command instructs the first access device to hand over a terminal to the second access device.

2. The method according to claim 1, wherein obtaining, by the network device, the address information of the target mobility management network element in the second network based on the identifier of the second access device or the identity of the tracking area served by the second access device comprises:

constructing, by the network device, a first fully qualified domain name based on the identifier of the second access device, wherein the first fully qualified domain name comprises the identifier of the second access device;

sending, by the network device, the first fully qualified domain name to a domain name system (DNS) server, wherein the first fully qualified domain name is used to determine address information of one or more candidate mobility management network elements in the 5G network;

receiving, by the network device, the address information of the one or more candidate mobility management network elements in the 5G network from the DNS server; and selecting, by the network device, the address information of the target mobility management network element in the 5G network from the address information of the one or more candidate mobility management network elements.

3. The method according to claim 2, wherein:
a format of the first fully qualified domain name is a fully qualified domain name format corresponding to an identifier of an access device in the 5G network; or
a format of the first fully qualified domain name is a fully qualified domain name format corresponding to an identifier of an access device in the 4G network.

4. The method according to claim 1, wherein obtaining, by the network device, the address information of the target mobility management network element in the second network based on the identifier of the second access device or the identity of the tracking area served by the second access device comprises:

constructing, by the network device, a second fully qualified domain name based on the identity of the tracking area served by the second access device, wherein the second fully qualified domain name comprises the identity of the tracking area served by the second access device;

sending, by the network device, the second fully qualified domain name to a domain name system (DNS) server, wherein the second fully qualified domain name is used to determine address information of one or more candidate mobility management network elements in the 5G network;

receiving, by the network device, the address information of the one or more candidate mobility management network elements in the 5G network from the DNS server; and selecting, by the network device, the address information of the target mobility management network element in the 5G network from the address information of the one or more candidate mobility management network elements.

5. The method according to claim 4, wherein:
a format of the second fully qualified domain name is a fully qualified domain name format corresponding to an identity of a tracking area in the 5G network; or
a format of the second fully qualified domain name is a fully qualified domain name format corresponding to an identity of a tracking area in the 4G network.

6. The method according to claim 1, wherein obtaining, by the network device, the address information of the target mobility management network element in the second network based on the identifier of the second access device or the identity of the tracking area served by the second access device comprises:

constructing, by the network device, a third fully qualified domain name based on the identity of the tracking area served by the second access device, wherein the third fully qualified domain name comprises a mobile country code (MCC), a mobile network code (MNC), and 16 lower-order bits of a tracking area code (TAC) in the identity of the tracking area served by the second access device, and wherein a format of the third fully qualified domain name is a fully qualified domain name format corresponding to an identity of a tracking area in the 4G network;

sending, by the network device, the third fully qualified domain name to a domain name system (DNS) server, wherein the third fully qualified domain name is used to query address information of one or more candidate mobility management network elements in the 5G network;

receiving, by the network device, the address information of the one or more candidate mobility management network elements in the 5G network from the DNS server; and selecting, by the network device, the address information of the target mobility management network element in the 5G network from the address information of the one or more candidate mobility management network elements.

7. The method according to claim 6, wherein the 16 lower-order bits of the TAC in the identity of the tracking area served by the second access device are the same as a TAC in an identity of a tracking area served by the first access device.

8. The method according to claim 1, wherein relocating to the target mobility management network element based on the address information of the target mobility management network element comprises:

sending, by the network device, a forward relocation request message to the target mobility management network element, wherein the forward relocation request message carries a 4G context of the terminal, and requests the target mobility management network element to prepare a resource for the terminal.

9. The method according to claim 1, wherein obtaining, by the network device, the address information of the target mobility management network element in the second network based on the identifier of the second access device or the identity of the tracking area served by the second access device comprises:

sending, by the network device, the identifier of the second access device or the identity of the tracking area served by the second access device to a network repository function network element, wherein the identifier of the second access device or the identity of the tracking area served by the second access device is used to query address information of one or more candidate mobility management network elements in the 5G network;

receiving, by the network device, the address information of the one or more candidate mobility management network elements in the 5G network from the network repository function network element; and selecting, by the network device, the address information of the target mobility management network element in the 5G network from the address information of the one or more candidate mobility management network elements.

10. The method according to claim 9, wherein relocating to the target mobility management network element based on the address information of the target mobility management network element comprises:

sending, by the network device, a context create request message to the target mobility management network element, wherein the context create request message carries a 5G context converted from a 4G context of the terminal, and requests the target mobility management network element to prepare a resource for the terminal.

11. The method according to claim 10, further comprising:

receiving, by the network device, an N2 notification message from the target mobility management network element, wherein the N2 notification message indicates to the network device to release a related resource of the terminal; and releasing, by the converged network device, the resource of the terminal based on the N2 notification message.

12. A network device, comprising:
a processor; and
a non-transitory computer-readable storage medium storing a program to be executed by the processor, the program including instructions for:

receiving a handover requirement from a first access device in a first network, wherein the handover requirement carries an identifier of a second access device in a second network or an identity of a tracking area served by the second access device, wherein the first network is a 4th generation (4G) network, and the second network is a 5th generation (5G) network;

determining, based on the identifier of the second access device or the identity of the tracking area served by the second access device, that the second access device is not managed by the network device;

obtaining address information of a target mobility management network element in the second network based on the identifier of the second access device or the identity of the tracking area served by the second access device, and relocating to the target mobility management network element based on the address information of the target mobility management network element; and sending a handover command to the first access device, wherein the handover command instructs the first access device to hand over a terminal to the second access device.

13. The network device according to claim 12, wherein obtaining the address information of the target mobility management network element in the second network based on the identifier of the second access device or the identity of the tracking area served by the second access device is comprises:

constructing a first fully qualified domain name based on the identifier of the second access device, wherein the first fully qualified domain name comprises the identifier of the second access device;

sending the first fully qualified domain name to a domain name system (DNS) server, wherein the first fully qualified domain name is used to determine address information of one or more candidate mobility management network elements in the 5G network;

receiving the address information of the one or more candidate mobility management network elements in the 5G network from the DNS server; and selecting the address information of the target mobility management network element in the 5G network from the address information of the one or more candidate mobility management network elements.

14. The network device according to claim 12, wherein obtaining the address information of the target mobility management network element in the second network based on the identifier of the second access device or the identity of the tracking area served by the second access device comprises:

constructing a second fully qualified domain name based on the identity of the tracking area served by the second access device, wherein the second fully qualified domain name comprises the identity of the tracking area served by the second access device;

sending the second fully qualified domain name to a domain name system (DNS) server, wherein the second fully qualified domain name is used to determine address information of one or more candidate mobility management network elements in the 5G network;

receiving the address information of the one or more candidate mobility management network elements in the 5G network from the DNS server; and selecting the address information of the target mobility management network element in the 5G network from the address information of the one or more candidate mobility management network elements.

15. The network device according to claim 12, wherein obtaining the address information of the target mobility management network element in the second network based on the identifier of the second access device or the identity of the tracking area served by the second access device comprises:

constructing a third fully qualified domain name based on the identity of the tracking area served by the second access device, wherein the third fully qualified domain name comprises a mobile country code (MCC), a mobile network code (MNC), and 16 lower-order bits of a tracking area code (TAC) in the identity of the tracking area served by the second access device, and a format of the third fully qualified domain name is a fully qualified domain name format corresponding to an identity of a tracking area in the 4G network;

sending the third fully qualified domain name to a domain name system (DNS) server, wherein the third fully qualified domain name is used to query address information of one or more candidate mobility management network elements in the 5G network;

receiving the address information of the one or more candidate mobility management network elements in the 5G network from the DNS server; and selecting the address information of the target mobility management network element in the 5G network from the address information of the one or more candidate mobility management network elements.

16. The network device according to claim 12, wherein relocating to the target mobility management network element based on the address information of the target mobility management network element comprises:
sending a forward relocation request message to the target mobility management network element, wherein the forward relocation request message carries a 4G context of the terminal, and requests the target mobility management network element to prepare a resource for the terminal.

17. The network device according to claim 12, wherein obtaining the address information of the target mobility management network element in the second network based on the identifier of the second access device or the identity of the tracking area served by the second access device comprises:
sending the identifier of the second access device or the identity of the tracking area served by the second access device to a network repository function network element, wherein the identifier of the second access device or the identity of the tracking area served by the second access device is used to query address information of one or more candidate mobility management network elements in the 5G network;
receiving the address information of the one or more candidate mobility management network elements in the 5G network from the network repository function network element; and
selecting the address information of the target mobility management network element in the 5G network from the address information of the one or more candidate mobility management network elements.

18. The network device according to claim 12, wherein relocating to the target mobility management network element based on the address information of the target mobility management network element comprises:
sending a context create request message to the target mobility management network element, wherein the context create request message carries a 5G context converted from a 4G context of the terminal, and requests the target mobility management network element to prepare a resource for the terminal.

19. A system, comprising:
a network device;
a first access device in a first network; and
a second access device in a second network, wherein the first network is a 4th generation (4G) network, and the second network is a 5th generation (5G) network;
wherein the first access device is configured to send a handover requirement to the network device, wherein the handover requirement carries an identifier of the second access device or an identity of a tracking area served by the second access device;
wherein the network device is configured to:
receive the handover requirement from the first access device;
determine, based on the identifier of the second access device or the identity of the tracking area served by the second access device, that the second access device is not managed by the network device;
obtain address information of a target mobility management network element in the second network based on the identifier of the second access device or the identity of the tracking area served by the second access device, and relocate to the target mobility management network element based on the address information of the target mobility management network element; and
send a handover command to the first access device, wherein the handover command instructs the first access device to hand over a terminal to the second access device.

20. The system according to claim 19, wherein the network device being configured to obtain the address information of the target mobility management network element in the second network based on the identifier of the second access device or the identity of the tracking area served by the second access device comprises the network device being configured to:
construct a second fully qualified domain name based on the identity of the tracking area served by the second access device, wherein the second fully qualified domain name comprises the identity of the tracking area served by the second access device;
send the second fully qualified domain name to a domain name system (DNS) server, wherein the second fully qualified domain name is used to determine address information of one or more candidate mobility management network elements in the 5G network;
receive the address information of the one or more candidate mobility management network elements in the 5G network from the DNS server; and
select the address information of the target mobility management network element in the 5G network from the address information of the one or more candidate mobility management network elements.

* * * * *

UNITED STATES PATENT AND TRADEMARK OFFICE
CERTIFICATE OF CORRECTION

PATENT NO. : 11,432,218 B2
APPLICATION NO. : 17/107545
DATED : August 30, 2022
INVENTOR(S) : Jing Chen It is certified that error appears in the above-identified patent and that said Letters Patent is hereby corrected as shown below:

In the Claims

Claim 11, Column 35, Line 35; delete "the converged network" and insert --the network--.

Signed and Sealed this
Twenty-seventh Day of September, 2022

Katherine Kelly Vidal
*Director of the United States Patent and Trademark Office*